(12) United States Patent
Mase et al.

(10) Patent No.: US 9,151,831 B2
(45) Date of Patent: Oct. 6, 2015

(54) DISTANCE MEASUREMENT DEVICE

(75) Inventors: Mitsuhito Mase, Hamamatsu (JP); Takashi Suzuki, Hamamatsu (JP); Jun Hiramitsu, Hamamatsu (JP)

(73) Assignee: HAMAMATSU PHOTONICS K.K., Hamamatsu-shi, Shizuoka (JP)

( * ) Notice: Subject to any disclaimer, the term of this patent is extended or adjusted under 35 U.S.C. 154(b) by 0 days.

(21) Appl. No.: 14/357,817

(22) PCT Filed: Aug. 21, 2012

(86) PCT No.: PCT/JP2012/071075
§ 371 (c)(1),
(2), (4) Date: May 13, 2014

(87) PCT Pub. No.: WO2013/099348
PCT Pub. Date: Jul. 4, 2013

(65) Prior Publication Data
US 2014/0327903 A1    Nov. 6, 2014

(30) Foreign Application Priority Data
Dec. 28, 2011 (JP) .................................. 2011-288343

(51) Int. Cl.
*G01S 7/486* (2006.01)
*G01S 17/89* (2006.01)

(52) U.S. Cl.
CPC ............. *G01S 7/4861* (2013.01); *G01S 7/4863* (2013.01); *G01S 17/89* (2013.01)

(58) Field of Classification Search
CPC ..... G01S 7/4816; G01S 7/4868; G01S 17/89; G01S 7/484; G01S 7/4876
USPC .............. 356/3.01–3.15, 4.01–4.1, 5.01–5.15
See application file for complete search history.

(56) References Cited

U.S. PATENT DOCUMENTS

| | | | | |
|---|---|---|---|---|
| 5,848,305 | A * | 12/1998 | Takasaki | .......................... 396/96 |
| 7,379,100 | B2 | 5/2008 | Gokturk et al. | |
| 2009/0008532 | A1* | 1/2009 | Setoguchi | .................. 250/208.1 |
| 2009/0284731 | A1* | 11/2009 | Jin et al. | ...................... 356/4.01 |
| 2010/0073541 | A1 | 3/2010 | Kawahito | |
| 2011/0037969 | A1* | 2/2011 | Spickermann et al. | ...... 356/5.01 |

(Continued)

FOREIGN PATENT DOCUMENTS

| | | | |
|---|---|---|---|
| EP | 2 187 237 | 5/2010 | |
| EP | 2 541 275 | 1/2013 | |

(Continued)

OTHER PUBLICATIONS

English-language translation of International Preliminary Report on Patentability (IPRP) dated Jul. 10, 2014 that issued in WO Patent Application No. PCT/JP2012/071075.

*Primary Examiner* — Luke Ratcliffe
(74) *Attorney, Agent, or Firm* — Drinker Biddle & Reath LLP

(57) ABSTRACT

In a distance measurement device of an embodiment, a light source emits modulation light in a first charge transfer cycle, and emission of the modulation light of the light source is stopped in a second charge transfer cycle. In each of the first and second charge transfer cycles, the charges generated in a photosensitive region are distributed to a first accumulation region and a second accumulation region. A first value is obtained based on readout values corresponding to amounts of accumulated charges of the first accumulation region. A second value is obtained based on readout values corresponding to amounts of accumulated charges of the second accumulation region. A distance is calculated based on the first value and the second value.

7 Claims, 12 Drawing Sheets

(56) References Cited

U.S. PATENT DOCUMENTS

| | | | |
|---|---|---|---|
| 2012/0182540 A1* | 7/2012 | Suzuki et al. | 356/4.01 |
| 2012/0194799 A1* | 8/2012 | Kamiyama et al. | 356/5.01 |

FOREIGN PATENT DOCUMENTS

| | | |
|---|---|---|
| JP | S57-179772 | 11/1982 |
| JP | 2004-294420 A | 10/2004 |
| JP | 2005-235893 A | 9/2005 |
| JP | 2006-523074 A | 10/2006 |
| JP | 2008-122223 A | 5/2008 |
| JP | 2009-041943 A | 2/2009 |
| JP | 2013-137242 | 7/2013 |
| WO | WO 2011/105438 | 9/2011 |

* cited by examiner

DISTANCE MEASUREMENT DEVICE

TECHNICAL FIELD

Embodiments of the present invention relate to a distance measurement device.

BACKGROUND ART

A time-of-flight (TOF) method for measuring a distance from an object to a distance sensor by emitting a pulsed light from a light source and receiving reflected light from the object using the distance sensor is known.

A distance measurement device based on a TOF method is described in Patent Literatures 1 and 2 below. The device described in Patent Literature 1 emits pulsed light from a light source, acquires, from a distance sensor, a signal having a value corresponding to an amount of charges generated by a photodiode of the distance sensor in each of sub-periods having different lengths in one frame period, and calculates a distance based on a best signal among a plurality of acquired signals.

The device described in Patent Literature 2 has a configuration for widening an effective dynamic range of a distance sensor. Specifically, this device emits pulsed light from a light source, accumulates charges generated by a photodiode of the distance sensor in a capacitor, resets a voltage generated in the capacitor when the voltage reaches a saturation voltage, and calculates a distance based on the number of resets and a last voltage generated in the capacitor.

Further, background light is included in light to be incident on the distance sensor, in addition to signal light generated by the pulsed light emitted from the light source being reflected from an object. The distance measurement devices described in Patent Literatures 1 and 2 do not basically consider removal of noise components, such as a background light component included in the signal from the distance sensor.

Another distance measurement device based on a TOF method is described in Patent Literature 3 below. The device described in Patent Literature 3 emits pulsed light from a light source, acquires a signal from a distance sensor in a first frame period, and acquires a signal from the distance sensor with the light source being in a non-emission state in a second frame period. The frame period is a time period from resetting charges of an accumulation region which accumulates charges generated by a photosensitive region of the sensor to next resetting of the charges of the accumulation region. This device removes noise components in a signal by subtracting the signal of the second frame period from the signal of the first frame period. The device calculates the distance based on the signal from which the noise components have been removed in this way.

CITATION LIST

Patent Literature

Patent Literature 1: U.S. Pat. No. 7,379,100
Patent Literature 2: Japanese Patent Application No. 2006-523074
Patent Literature 3: Published Japanese Translation of PCT

SUMMARY OF INVENTION

Technical Problem

In the device described in Patent Literature 3, if a noise such as different background light is generated in each frame period, accuracy of distance measurement deteriorates. Further, the device has a low frame rate since the device measures the distance using the two frame periods.

Therefore, the distance measurement device capable of calculating a distance with high precision without reducing a frame rate even when a noise fluctuating in a short period is generated is desired in the art.

Solution to Problem

An aspect of the present invention relates to a distance measurement device for determining a distance from an object using a time-of-flight method. The distance measurement device includes a light source unit, a sensor unit, and a processing unit. The light source unit emits modulation light. The sensor unit includes a photosensitive region which generates charges according to incident light, a first accumulation region and a second accumulation region which accumulate the charges generated in the photosensitive region, a first transfer electrode provided between the photosensitive region and the first accumulation region, a second transfer electrode provided between the photosensitive region and the second accumulation region, a first reset switch provided between the first accumulation region and a reset potential, and a second reset switch provided between the second accumulation region and the reset potential. The processing unit controls an emission timing of the modulation light and the sensor unit to calculate a distance.

In one or more of first charge transfer cycles in a frame period that is a time period continuing from a time at which the first accumulation region and the second accumulation region are connected to the reset potential with control of the first reset switch and the second reset switch to a time at which the first accumulation region and the second accumulation region are next connected to the reset potential, the processing unit (a1) causes the light source unit to emit in one or more emission periods, (a2) controls a voltage to be applied to the first transfer electrode in one or more first transfer periods synchronized with the one or more emission periods to cause charges generated in the photosensitive region to be accumulated in the first accumulation region, and (a2) controls a voltage to be applied to the second transfer electrode in one or more second transfer periods inverted in phase with the one or more first transfer periods to cause charges generated in the photosensitive region to be accumulated in the second accumulation region.

In one or more of second charge transfer cycles which alternates with the one or more of the first charge transfer cycles in the frame period, the processing unit, (b1) without causing the light source unit to emit the modulation light, (b2) controls a voltage to be applied to the first transfer electrode in a third transfer period to cause charges generated in the photosensitive region to be accumulated in the first accumulation region, and (b2) controls voltage to be applied to the second transfer electrode in a fourth transfer period inverted in phase with the third transfer period to cause charges generated in the photosensitive region to be accumulated in the second accumulation region.

In one or more of first readout cycles corresponding to the one or more of first charge transfer cycles, the processing unit acquires, from the sensor unit, first readout values corresponding to amounts of charges accumulated in the first accumulation region at time points between the one or more of first charge transfer cycles and the following second charge transfer cycles, respectively, and second readout values corresponding to amounts of charges accumulated in the second accumulation region at the time points, respectively.

In one or more of second readout cycles corresponding to the one or more of second charge transfer cycles, the processing unit acquires, from the sensor unit, first other readout values corresponding to amounts of charges accumulated in the first accumulation region at time points between the one or more of second charge transfer cycles and the following first charge transfer cycles, respectively, and second other readout values corresponding to amount of charges accumulated in the second accumulation region at the time points, respectively.

The processing unit calculates a first value that is a value obtained by subtracting the first other readout values of the $n^{th}$ and $(n-1)^{th}$ second readout cycles from a value of twice the first readout value of the $n^{th}$ first readout cycle, and a second value that is a value obtained by subtracting the second other readout value of the $n^{th}$ and $(n-1)^{th}$ second readout cycles from a value of twice the second readout value of the $n^{th}$ first readout cycle to determine M first values and M second values, where n indicates an order of the plurality of first readout cycles and the plurality of second readout cycles. The processing unit calculates the distance based on the M first values and the M second values.

In this distance measurement device, the first charge transfer cycles in which the light source unit is caused to emit the modulation light and charges are distributed to the first accumulation region and the second accumulation region, and the second charge transfer cycles in which charges are distributed to the first accumulation region and the second accumulation region without causing the light source unit to emit the modulation light are alternately performed in one frame period. In each of the first charge transfer cycles, the charges based on the incident light including the reflected light from the object for the modulation light are accumulated as increased charges in the accumulation region, and in each of the second charge transfer cycles, charges based on a noise such as background light are accumulated as increased charges. The values (i.e., the first value and the second value) corresponding to the increase of the charge amount in each first charge transfer cycle is obtained by subtracting, from a value of twice the readout value corresponding to the amount of accumulated charges directly after the first charge transfer cycle, the other readout value corresponding to the amount of accumulated charges directly after the second charge transfer cycle which is immediately before the first charge transfer cycle and the other readout value corresponding to the amount of accumulated charges directly after the next second charge transfer cycle of the first charge transfer cycle. Since this distance measurement device calculates the distance based on the first values and the second value, the distance measurement device can calculate the distance with high precision without reducing the frame rate even when a noise such as background light fluctuating in a short period is generated. Further, since the sensor unit of this distance measurement device does not need an additional accumulation region for acquiring the charges based on the noise, other than the two accumulation regions for charge distribution, a configuration of the sensor unit is not complicated, and a mounting area in the sensor unit can be effectively used.

In an embodiment, a time length in which the charges are accumulated in the first accumulation region in the first charge transfer cycles, a time length in which the charges are accumulated in the second accumulation region in the first charge transfer cycles, a time length in which the charges are accumulated in the first accumulation region in the second charge transfer cycle, and a time length in which the charges are accumulated in the second accumulation region in the second charge transfer cycle may be substantially the same time length.

In an embodiment, each of the plurality of first charge transfer cycles may include one first transfer period and one second transfer period. According to the present embodiment, it is possible to shorten the time lengths of the first charge transfer cycle and the second charge transfer cycle corresponding thereto. As a result, it is possible to calculate the distance with high precision even when a noise fluctuating in a shorter period is generated.

In an embodiment, the processing unit may (c1) identify a last second readout cycle in which the first other readout value and the second other readout value do not exceed a predetermined threshold among the plurality of second readout cycles, and (c2) determine the M first values based on one or more first readout values and one or more first other readout values obtained up to the last second readout cycle, and determines the M second values based on one or more second readout values and one or more second other readout values obtained up to the last second readout cycle. According to this embodiment, it is possible to calculate the distance using readout values in a range not exceeding a readout value corresponding to the saturation accumulation capacity by setting a predetermined threshold to a value equal to or more than a readout value corresponding to the saturation accumulation capacity of the accumulation region. As a result, it is possible to calculate the distance with higher precision.

In an embodiment, the processing unit may (d1) stop the first readout cycle and the second readout cycle subsequent to the $(n+1)^{th}$ readout cycle when a sum of the first other readout value of the $n^{th}$ second readout cycle and a difference value between the first other readout value of the $n^{th}$ second readout cycle and the first other readout value of the $(n-1)^{th}$ second readout cycle or a sum of the second other value of the $n^{th}$ second readout cycle and a difference value between the second other value of the $n^{th}$ second readout cycle and the second other value of the $(n-1)^{th}$ second readout cycle exceeds a predetermined threshold, and (d2) determine the M first values based on one or more first readout values and one or more first other readout values obtained up to the $n^{th}$ second readout cycle which is the last readout cycle, and determine the M second values based on one or more second readout values and one or more second other readout values obtained up to the last readout cycle. In this embodiment, it is possible to calculate the distance using readout values in a range not exceeding a readout value corresponding to the saturation accumulation capacity by setting the predetermined threshold to a value equal to or more than a readout value corresponding to the saturation accumulation capacity of the accumulation region. Further, a dynamic range of the measured distance can be improved. Furthermore, according to the present embodiment, it is possible to start calculation of the distance early since the acquisition of the readout value from the sensor unit can stop when the above-described sum exceeds the predetermined threshold.

In an embodiment, the processing unit may (e1) sequentially integrate the M first values to calculate M first integrated values and sequentially integrates integrated values of the M second values to calculate M second integrated values, (e2) calculate a first estimated value using an approximate equation based on the M first integrated values and calculates a second estimated value using an approximate equation based on the M second integrated values, and (e3) calculate the distance based on the first estimated value and the second estimated value. According to this embodiment, even when some of the first values and the second values fluctuate, the influence of the value including the fluctuation is reduced in the first estimated value and the second estimated value based on the approximate equation. Thus, according to this distance measurement device, accuracy of the distance measurement can be further improved.

Advantageous Effects of Invention

As described above, according to the aspects and embodiments of the present invention, the distance measurement device capable of calculating a distance with high precision without reducing a frame rate even when a noise fluctuating in a short period is generated can be provided.

DESCRIPTION OF EMBODIMENTS

Hereinafter, various embodiments will be described in detail with reference to the drawings. In each drawing, the same or similar units are denoted with the same reference signs.

Figure 1:
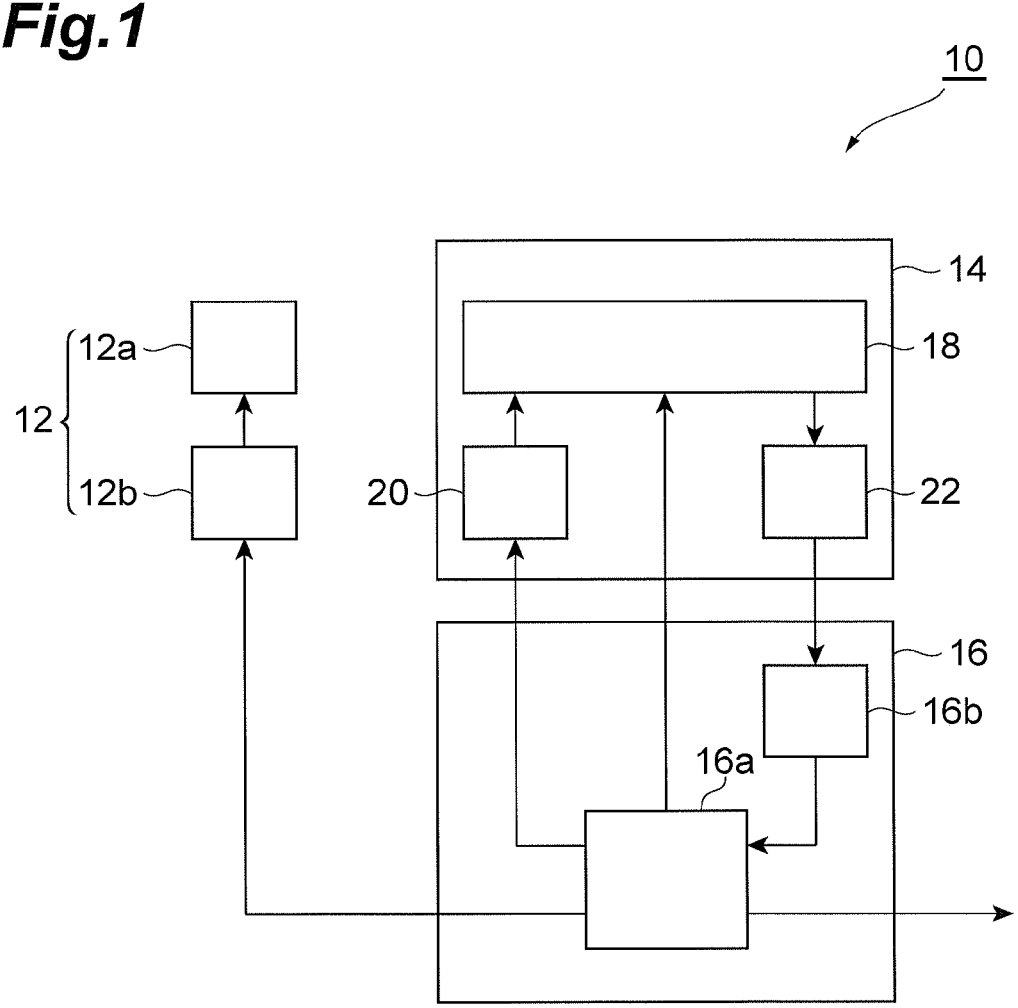
FIG. 1 is a diagram schematically illustrating a distance measurement device according to an embodiment.

FIG. 1 is a diagram schematically illustrating a distance measurement device according to an embodiment. The distance measurement device 10 illustrated in FIG. 1 is a device for determining a distance between an object and the distance measurement device 10 using a time-of-flight (TOF) method. The distance measurement device 10 includes a light source unit 12, a sensor unit 14, and a processing unit 16.

The light source unit 12 emits modulation light. In an embodiment, the light source unit 12 may include a laser diode 12a and a driver circuit 12b. The driver circuit 12b supplies to the laser diode 12a a modulation current synchronized with a drive pulse signal provided from the processing unit 16. The laser diode 12a emits the modulation light according to the modulation current. For example, the modulation light may include one or more pulsed lights.

In an embodiment, the sensor unit 14 may include a sensor 18, a digital-to-analog conversion unit (DAC) 20, and an analog-to-digital conversion unit (ADC) 22. The DAC 20 converts a digital signal from a signal processing unit 16a of the processing unit 16 into an analog signal and provides the analog signal to the sensor 18. The ADC 22 converts an analog signal from the sensor 18 into a digital signal and provides the digital signal to the processing unit 16.

The processing unit 16 controls an emission timing of the modulation light of the light source unit 12 and the sensor unit 14 to calculate the distance. In an embodiment, the processing unit 16 may include the signal processing unit 16a and a memory 16b. The signal processing unit 16a is, for example, a calculation circuit such as an FPGA (Field-Programmable Gate Array), and the memory 16b is an SRAM (Static Random Access Memory).

Figure 2:
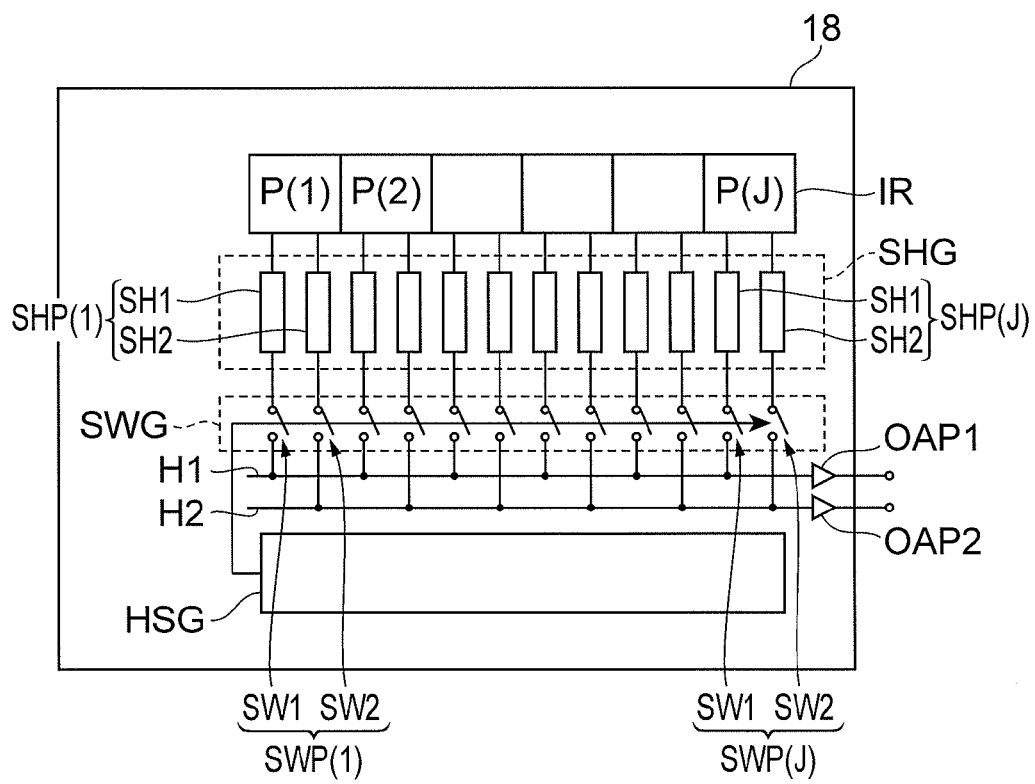
FIG. 2 is a diagram schematically illustrating an example of a sensor according to an embodiment.

FIG. 2 is a diagram schematically illustrating an example of a sensor according to an embodiment. The sensor 18 includes an imaging region IR, a sample-and-hold circuit group SHG, a switch group SWG, a horizontal shift register group HSG, signal lines H1 and H2, and output amplifiers OAP1 and OAP2.

In an embodiment, the sensor 18 may be configured as a line sensor which acquires an image of one row, as illustrated in FIG. 2. In the present embodiment, the imaging region IR includes a plurality of pixel units P(j) arranged in a horizontal direction. "j" is an integer ranging from 1 to J, and J is an integer equal to or more than 2 and indicates the number of pixel units.

Figure 3:
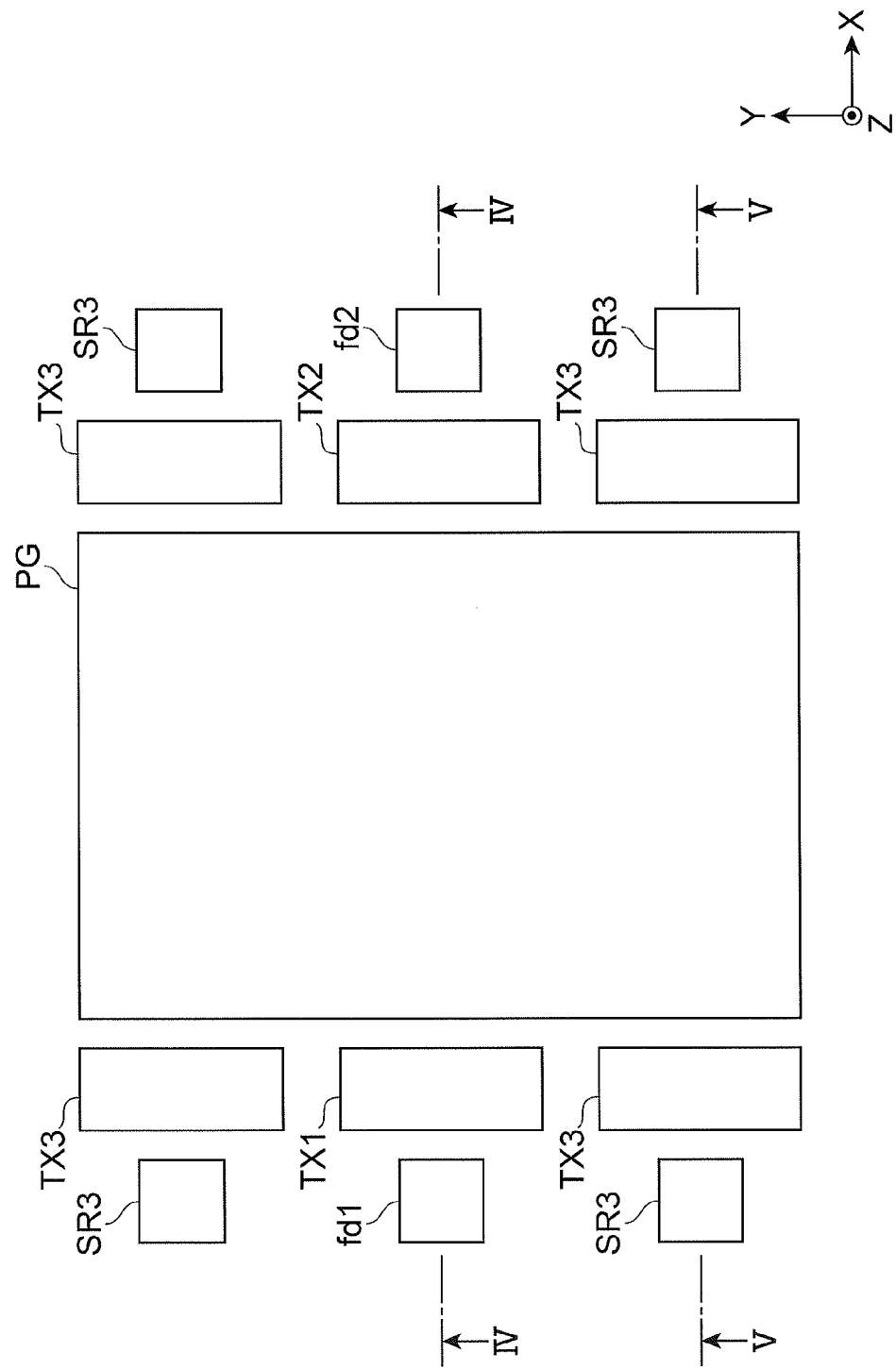
FIG. 3 is a plan view illustrating an example of one pixel unit in a sensor according to an embodiment.
Figure 4:
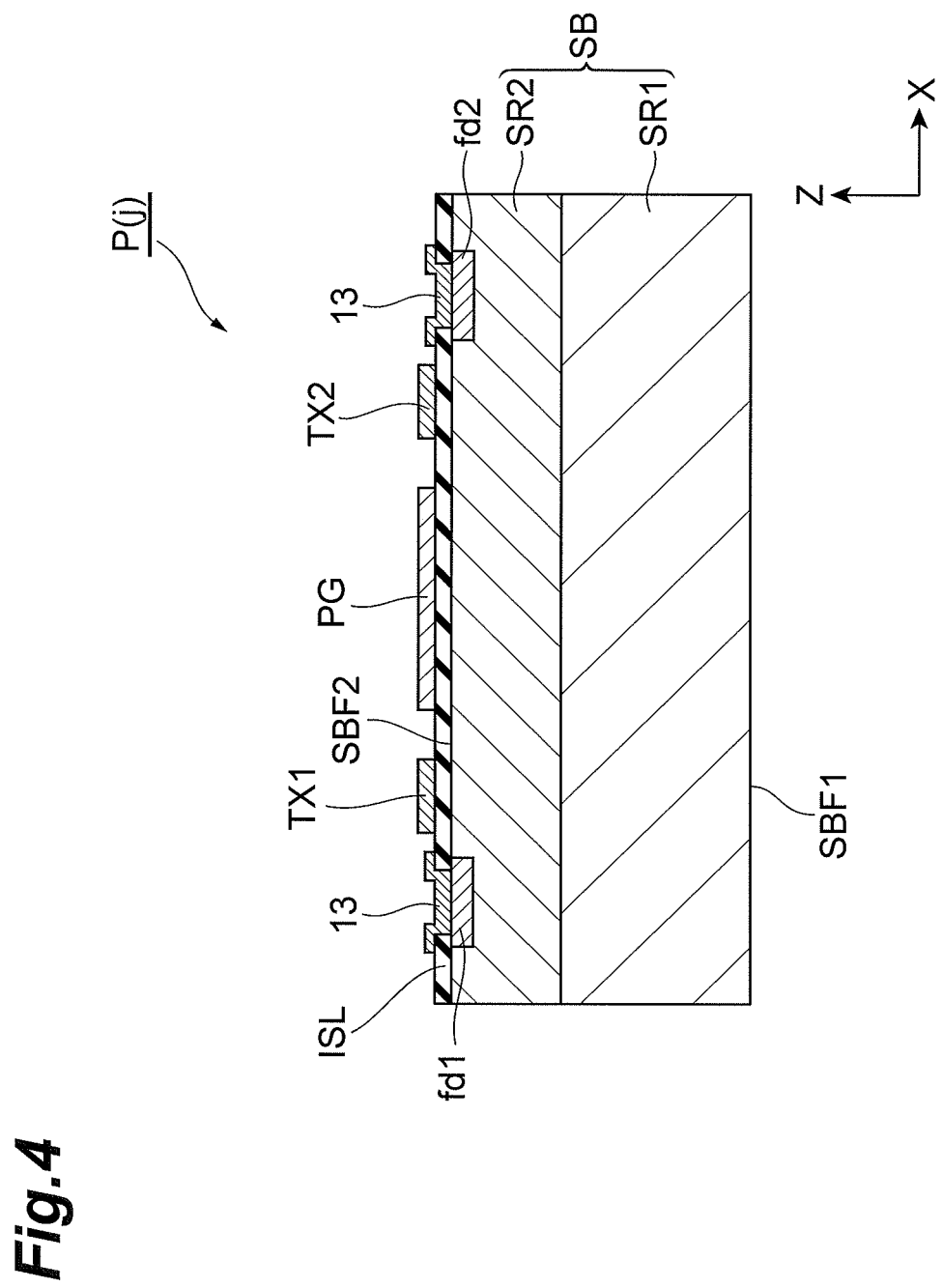
FIG. 4 is a cross-sectional view taken along a line IV-IV of FIG. 3.
Figure 5:
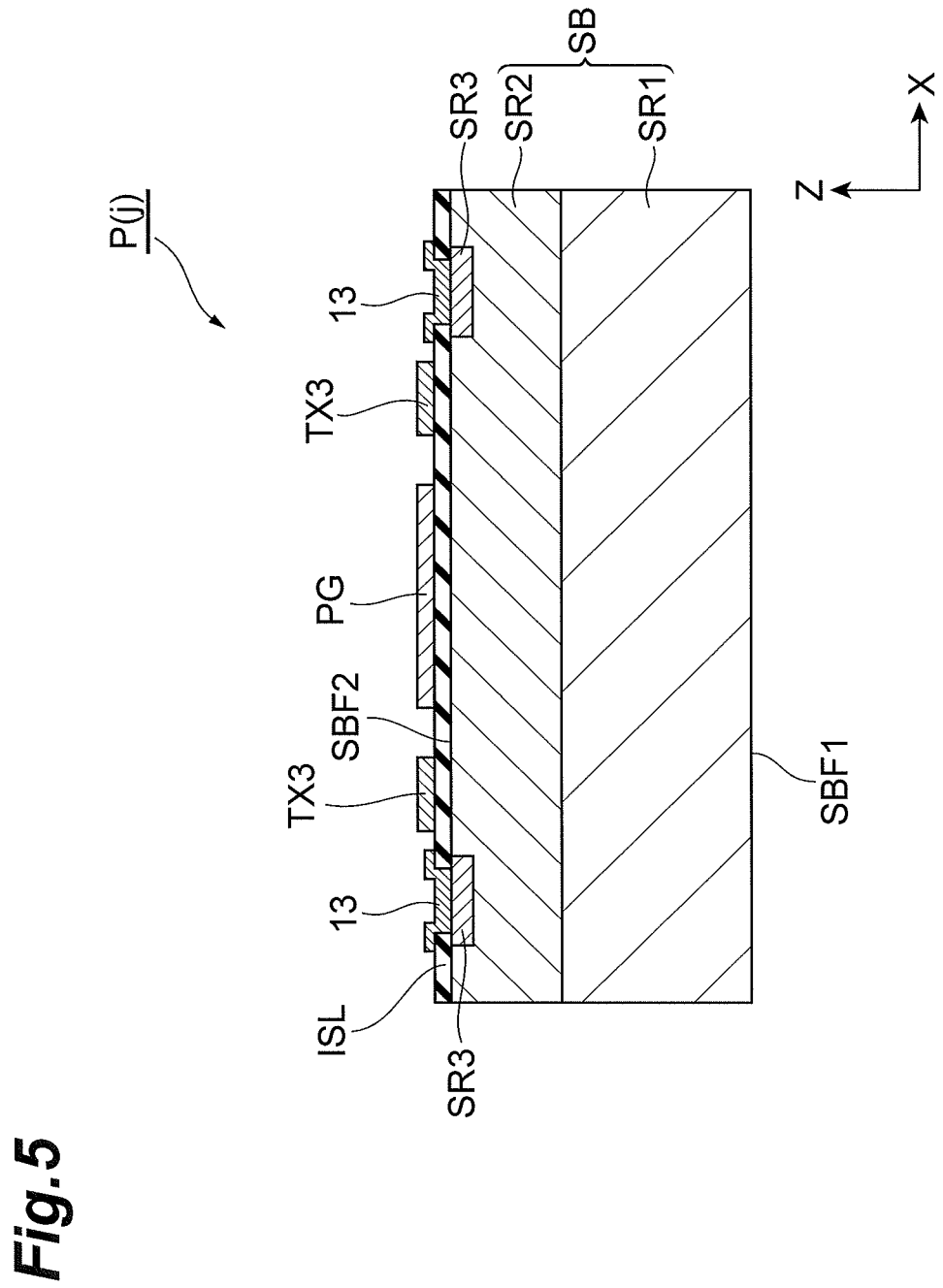
FIG. 5 is a cross-sectional view taken along a line V-V of FIG. 3.

FIG. 3 is a plan view illustrating an example of one pixel unit in a sensor according to an embodiment. FIG. 4 is a cross-sectional view taken along a line IV-IV of FIG. 3, and FIG. 5 is a cross-sectional view taken along a line V-V of FIG. 3. The pixel units P(1) to P(J) have the same structure illustrated in FIGS. 3 to 5.

In an embodiment, the pixel unit P(j) includes a semiconductor substrate SB, as illustrated in FIGS. 4 and 5. The semiconductor substrate SB is, for example, a silicon substrate. The semiconductor substrate SB includes a first semiconductor region SR1 and a second semiconductor region SR2. The first semiconductor region SR1 is a p-type semiconductor region which provides one main face SBF1 of the semiconductor substrate SB. The second semiconductor region SR2 is a p$^-$-type semiconductor region provided on the first semiconductor region SR1. An impurity concentration of the second semiconductor region SR2 is equal to or less than that of the first semiconductor region SR1. The semiconductor substrate SB may be formed by depositing the p$^-$-type semiconductor region on the p-type semiconductor substrate using an epitaxial growth method.

An insulation layer ISL is formed on the other main face SBF2 of the semiconductor substrate SB. The insulation layer ISL is formed of, for example, $SiO_2$. A photogate electrode PG is provided on the insulation layer ISL. The photogate electrode PG is formed of, for example, polysilicon. In an embodiment, the photogate electrode PG may have a substantially rectangular planar shape, as illustrated in FIG. 3. In the pixel unit P(j), a region located below this photogate electrode PG functions as a photosensitive region which senses incident light and generates charges.

A first transfer electrode TX1, a second transfer electrode TX2 and a third transfer electrode TX3 are provided on the insulation layer ISL, as illustrated in FIGS. 4 and 5. These transfer electrodes TX1 to TX3 are formed of, for example, polysilicon. The first transfer electrode TX1 and the second transfer electrode TX2 are arranged in such a manner that the photo gate electrode PG is interposed therebetween, as illustrated in FIGS. 3 to 5.

In an embodiment, four third transfer electrodes TX3 are provided on the insulation layer ISL, as illustrated in FIG. 3. Two of the third transfer electrodes TX3 are arranged in such a manner that the first transfer electrode TX1 is interposed therebetween in a direction (hereinafter referred to as a "Y direction") intersecting a direction (hereinafter referred to as an "X direction") in which the first transfer electrode TX1 and the second transfer electrode TX2 are arranged. Further, two other third transfer electrodes TX3 are arranged in such a manner that the second transfer electrode TX2 is interposed therebetween in the Y direction.

A first accumulation region fd1 and a second accumulation region fd2 are formed in the second semiconductor region SR2, as illustrated in FIG. 4. The first accumulation region fd1 and the second accumulation region fd2 accumulate charges transferred from the photosensitive region. The first accumulation region fd1 and the second accumulation region fd2 are arranged in such a manner that the photosensitive region is interposed therebetween. In an embodiment, the first accumulation region fd1 and the second accumulation region fd2 are $n^+$-type semiconductor regions doped with n-type impurities at a high concentration. The insulation layer ISL defines openings above the first accumulation region fd1 and the second accumulation region fd2. Electrodes 13 are provided in these openings. The electrode 13 is formed of, for example, tungsten provided via Ti/TiN films.

In the X direction, the first transfer electrode TX1 is present between the electrode 13 on the first accumulation region fd1 and the photogate electrode PG, and the second transfer electrode TX2 is arranged between the electrode 13 on the second accumulation region fd2 and the photo gate electrode PG. When charges are transferred from the photosensitive region to the first accumulation region fd1, a voltage VTX1 for reducing a potential of the semiconductor region below the first transfer electrode TX1 is applied to the first transfer electrode TX1. This voltage VTX1 is applied from the DAC 20 based on a digital signal from the signal processing unit 16a. Further, when charges are transferred from the photosensitive region to the second accumulation region fd2, a voltage VTX2 for reducing a potential of the semiconductor region below the second transfer electrode TX2 is applied to the second transfer electrode TX2. This voltage VTX2 is applied from the DAC 20 based on the digital signal from the signal processing unit 16a.

Further, $n^+$-type semiconductor regions SR3 are formed in the second semiconductor region SR2, as illustrated in FIG. 5. In an embodiment, four semiconductor regions SR3 are provided. A pair of semiconductor regions SR3 and the other pair of semiconductor regions SR3 are provided in such a manner that the photosensitive region is interposed therebetween. Above these semiconductor regions SR3, the insulation layer ISL defines openings, and electrodes 13 are provided within these openings. The electrode 13 is formed of, for example, tungsten provided via Ti/TiN films. In the X direction, a corresponding third transfer electrode TX3 is interposed between the electrode 13 on one semiconductor region SR3 and the photogate electrode PG. Charges are transferred from the photosensitive region to the semiconductor region SR3 by applying a voltage VTX3 to the third transfer electrode TX3 and reducing a potential of the semiconductor region below the third transfer electrode TX3. This voltage VTX3 is applied from the DAC 20 based on a digital signal from the signal processing unit 16a. The electrode 13 of the semiconductor region SR3 is connected to a predetermined potential Vdd (see FIG. 6). This potential Vdd is set by the DAC 20 based on the digital signal from the signal processing unit 16a. When the voltage VTX3 is applied to reduce the potential of the semiconductor region below the third transfer electrode TX3, the charges of the photosensitive region are reset.

Figure 6:
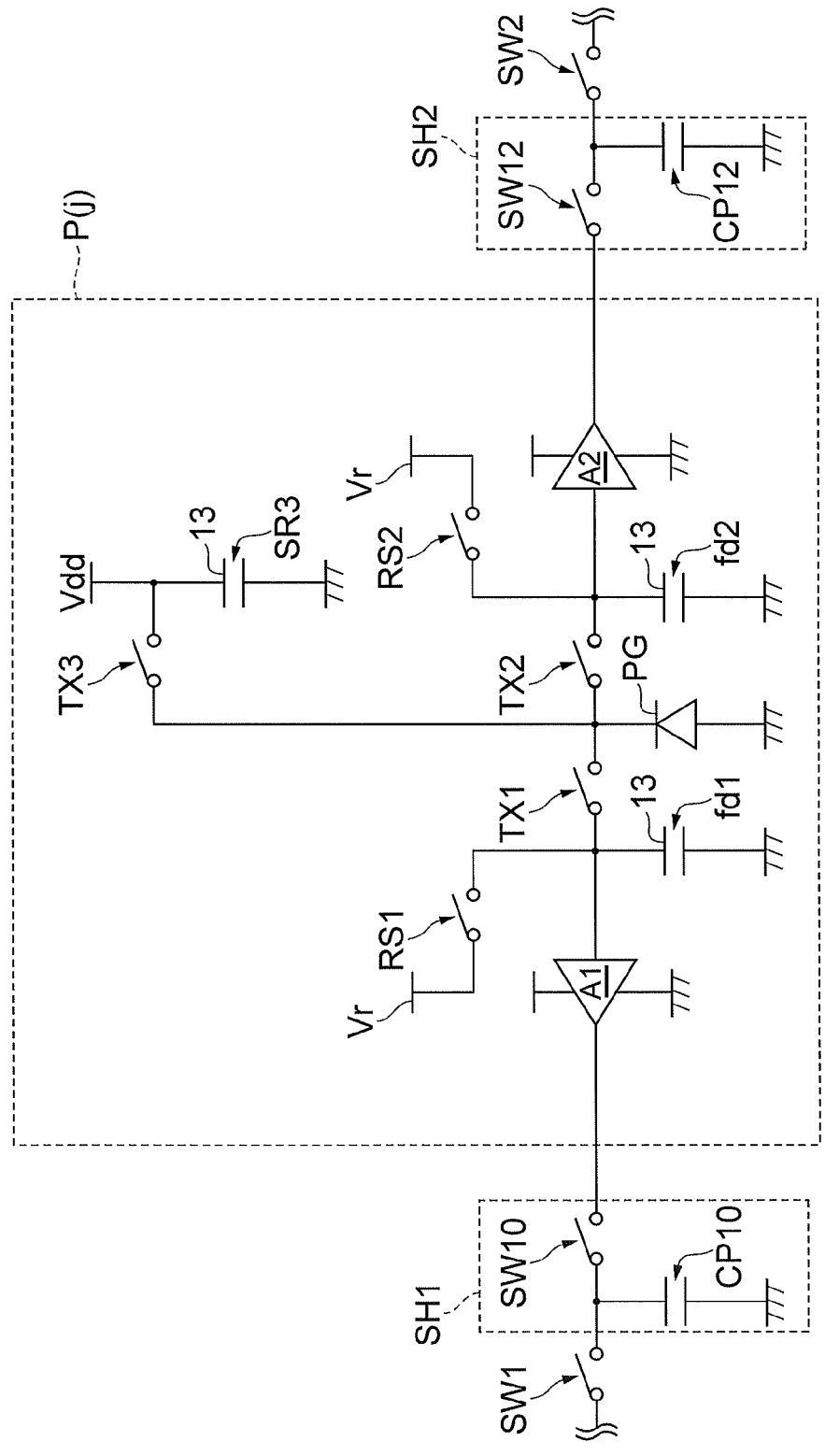
FIG. 6 is a circuit diagram of one pixel unit of the sensor unit and corresponding sample-and-hold circuits for the pixel unit according to an embodiment.

Hereinafter, FIGS. 2 and 6 will be referred to. FIG. 6 is a circuit diagram of one pixel unit of the sensor unit and corresponding sample-and-hold circuits for the pixel unit according to an embodiment. The sample-and-hold circuit group SHG of the sensor 18 includes J first sample-and-hold circuits SH1 and J second sample-and-hold circuits SH2, as illustrated in FIGS. 2 and 6. Each of the first sample-and-hold circuits SH1 and each of the second sample-and-hold circuits SH2 is connected to the corresponding pixel unit P(j) (a corresponding pixel unit among the pixel units P(1) to P(J)). In other words, the sample-and-hold circuit group SHG includes J sample-and-hold circuit pairs SHP(1) to SHP(J), each including one first sample-and-hold circuit SH1 and one second sample-and-hold circuit. The J sample-and-hold circuit pairs SHP(1) to SHP(J) are associated with the pixel units P(1) to P(J), respectively.

The pixel unit PG) further includes a first reset switch RS1, a second reset switch RS2, and charge-to-voltage conversion circuits A1 and A2. The first reset switch RS1 is provided between a reset potential Vr and an electrode 13 on the first accumulation region fd1. The second reset switch RS2 is provided between the reset potential Vr and an electrode 13 on the second accumulation region fd2. The reset potential Vr is set by the DAC 20 based on the digital signal from the signal processing unit 16a.

A reset pulse signal Sres is provided from the signal processing unit 16a to the first reset switch RS1 and the second reset switch RS2. When the reset pulse signal Sres is provided to the first reset switch RS1 and the second reset switch RS2, the first accumulation region fd1 and the second accumulation region fd2 are connected to the reset potential Vr. Accordingly, charges of the first accumulation region fd1 and charges of the second accumulation region fd2 are reset. A period between a timing at which the charges of the first accumulation region fd1 and the second accumulation region fd2 are reset and a next reset timing is a frame period Tf (see FIG. 8).

An input of the circuit A1 is connected to the electrode 13 on the first accumulation region fd1, and an output of the circuit A1 is connected to a switch SW10 of the sample-and-hold circuit SH1. The circuit A1 converts an amount of charges of the first accumulation region fd1 into a voltage and provides the voltage to the sample-and-hold circuit SH1. An input of the circuit A2 is connected to the electrode 13 on the second accumulation region fd2, and an output of the circuit A2 is connected to a switch SW12 of the sample-and-hold circuit SH2. The circuit A2 converts an amount of charges of the second accumulation region fd2 into a voltage and provides the voltage to the sample-and-hold circuit SH2.

The sample-and-hold circuit SH1 includes the switch SW10 and a capacitor CP10. The sample-and-hold circuit SH2 includes the switch SW12 and a capacitor CP12. A sampling pulse signal Ssamp is provided from the signal processing unit 16a to the switch SW10 and the switch SW12. When the sampling pulse signal Ssamp is provided to the switch SW10 and the switch SW12, the output of the circuit A1 and the capacitor CP10 are connected, and the output of the circuit A2 and the capacitor CP12 are connected. Accordingly, an output voltage of the circuit A1 is held between both terminals of the capacitor CP10, and an output voltage of the circuit A2 is held between both terminals of the capacitor CP12.

The switch group SWG of the sensor 18 includes J switches SW1 and J switches SW2. Each switch SW1 and each switch SW2 are connected to the capacitor CP10 of the sample-andhold circuit SH1 and the capacitor CP12 of the sample-and-hold circuit SH2 for the corresponding pixel unit among the pixel units P(1) to P(J), respectively. In other words, the switch group SWG includes J switch pairs SWP(1) to SWP(J) each including one switch SW1 and one switch SW2. The J switch pairs SWP(1) to SWP(J) are associated with the sample-and-hold circuit pairs SHP(1) to SHP(J), respectively.

A readout pulse signal Sread is provided to the switches SW1 and SW2. The reading pulse signal Sread is provided from the horizontal shift register group HSG. The horizontal shift register group HSG includes J horizontal shift registers. The horizontal shift register may include, for example, a flip-flop. These horizontal shift registers are arranged in an arrangement direction of the pixel units P(1) to P(J). A start signal is provided from the signal processing unit 16a to the horizontal shift register provided in one end in the horizontal shift register group HSG. Further, a clock signal is provided from the signal processing unit 16a to all the horizontal shift registers. The J horizontal shift registers sequentially provide the readout pulse signal Sread to the switch pairs SWP(1) to SWP(J) according to the start signal and the clock signal. The sample-and-hold circuits SH1 and the sample-and-hold circuits SH2 of the sample-and-hold circuit pairs SHP(1) to SHP(J) are sequentially connected to the signal line H1 and the signal line H2 by the readout pulse signal Sread being provided in this way.

More specifically, when the readout pulse signal Sread is provided to the switches SW1 and SW2, the capacitor CP10 of the sample-and-hold circuit SH1 and the capacitor CP12 of the sample-and-hold circuit SH2 are connected to the signal line H1 and the signal line H2, respectively. Accordingly, the voltage held in the sample-and-hold circuit SH1 is input to the output amplifier OAP1 via the signal line H1. Further, the voltage held in the sample-and-hold circuit SH2 is input to the output amplifier OAP2 via the signal line H2. The output amplifier OAP1 and the output amplifier OAP2 amplify the input voltage and output the amplified voltage to the ADC 22.

The ADC 22 converts the input voltage signal into a digital value having a value corresponding to a magnitude of the voltage signal. The digital value output by the ADC 22 is stored in the memory 16b of the processing unit 16. In the present embodiment, the digital value based on the voltage signal from the output amplifier OAP1 is stored in the memory 16b as a first readout value which will be described below. The first readout value is a value reduced as the amount of accumulated charges of the first accumulation region fd1 increases. Further, a digital value based on the voltage signal from the output amplifier OAP2 is stored in the memory 16b as a second readout value which will be described below. The second readout value is a value reduced as the amount of accumulated charges of the second accumulation region fd2 increases.

Figure 7:
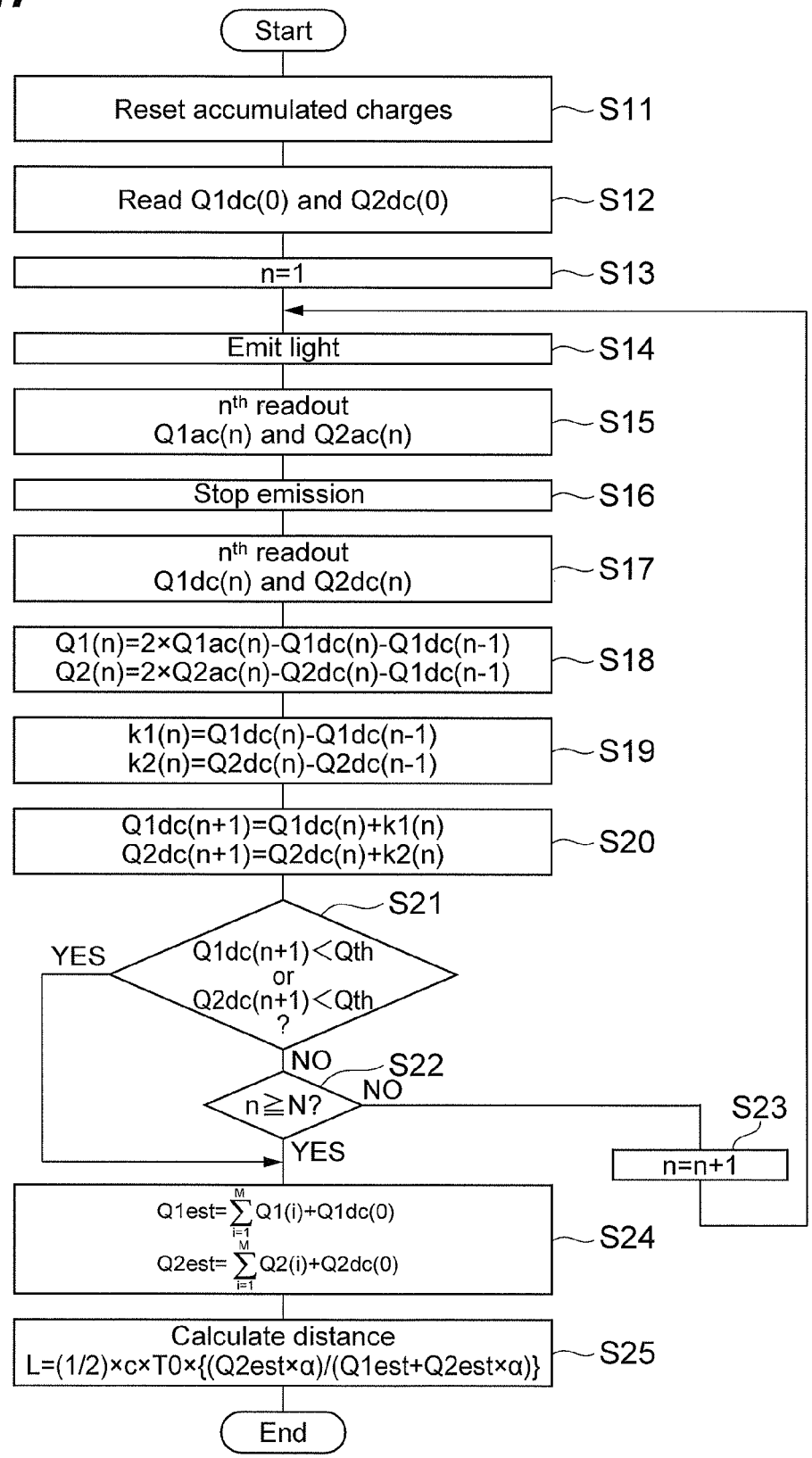
FIG. 7 is a flowchart illustrating control and calculation of a processing unit according to an embodiment.
Figure 8:
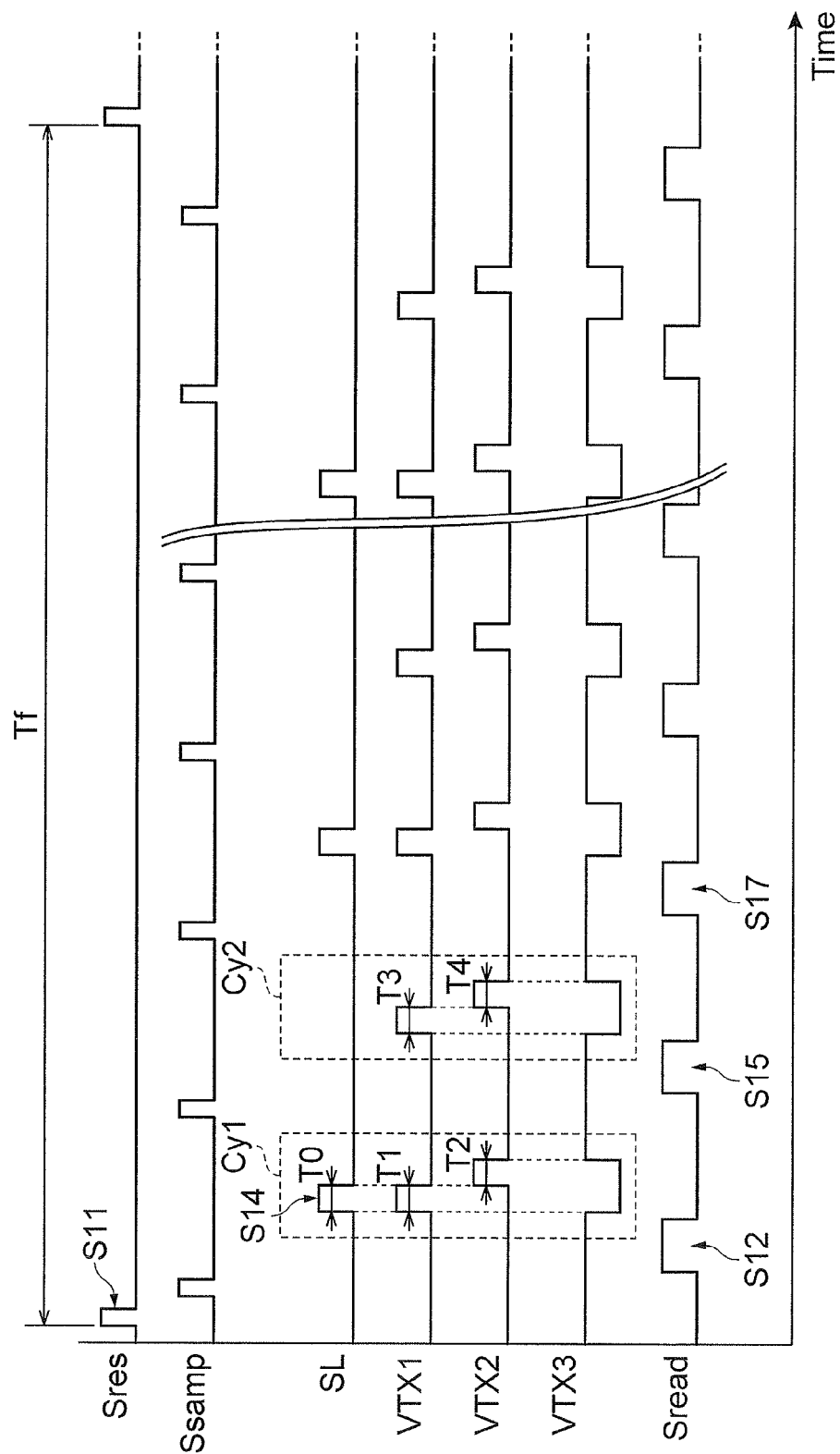
FIG. 8 is a timing chart of various signals used in the distance measurement device according to an embodiment.

Hereinafter, control and calculation of the processing unit 16 will be described. FIG. 7 is a flowchart illustrating control and calculation of the processing unit 16 according to an embodiment. Further, FIG. 8 is a timing chart of various signals used in the distance measurement device according to an embodiment. The processing unit 16 performs control and calculation for each pixel unit which will be described below with reference to FIGS. 7 and 8.

In an embodiment, the signal processing unit 16a of the processing unit 16 first provides the reset pulse signal Sres to the first reset switch RS1 and the second reset switch RS2 to connect the first accumulation region fd1 and the second accumulation region fd2 to the reset potential Vr. Accordingly, the charges accumulated in the first accumulation region fd1 and the charges accumulated in the second accumulation region fd2 are reset and the frame period Tf starts (step S11). This frame period continues until the reset pulse signal Sres is next provided to the first reset switch RS1 and the second reset switch RS2.

Then, the processing unit 16 acquires a first value Q1dc(0) and a second value Q2dc(0) from the sensor unit 14 and stores the first value Q1dc(0) and the second value Q2dc(0) as initial values in the memory 16b (step S12).

Specifically, the signal processing unit 16a provides a sampling pulse signal Ssamp to the switches SW10 and SW12 before an initial, first charge transfer cycle Cy1 starts. Accordingly, a voltage corresponding to the amount of charges accumulated in the first accumulation region fd1 at a time point earlier than the initial first charge transfer cycle Cy1 is held in the sample-and-hold circuit SH1, and the voltage corresponding to the amount of charges accumulated in the second accumulation region fd2 at the time point is held in the sample-and-hold circuit SH2.

Then, the signal processing unit 16a provides a start signal and a clock signal to the horizontal shift register group HSG so that the readout pulse signal Sread is provided from the horizontal shift register to the switches SW1 and SW2. Accordingly, the first value Q1dc(0) and the second value Q2dc(0) are acquired. The first value Q1dc(0) and the second value Q2dc(0) correspond to the amount of charges accumulated in the first accumulation region fd1 and the amount of charges accumulated in the second accumulation region fd2 between an output timing of the reset pulse signal Sres and an output timing of the first sampling pulse signal Ssamp, respectively. Therefore, the first value Q1dc(0) and the second value Q2dc(0) do not reflect a signal light component generated by the modulation light from the light source unit 12 being reflected from the object.

Then, the signal processing unit 16a sets n to 1 (step S13) and attempts first to $N^{th}$ first and second charge transfer cycles and first to $N^{th}$ first and second readout cycles as will be described below. "N" indicates an order of a predetermined maximum cycle.

First, the signal processing unit 16a provides a drive pulse signal SL to the light source unit 12 in the $n^{th}$ first charge transfer cycle Cy1 to cause the modulation light to be emitted from the light source unit 12 (step S14). A time length of the emission period of the modulation light from the light source unit 12 is T0. It should be noted that the signal processing unit 16a may provide a plurality of pulse signals as the drive pulse signal SL to the light source unit 12 in the period T0 to cause the light source unit 12 to emit the plurality of pulsed lights.

The signal processing unit 16a provides a digital signal to the sensor unit 14 so that a voltage signal VTX1 at a high level is applied to the first transfer electrode TX1 in the first transfer period T1 of the $n^{th}$ first charge transfer cycle Cy1. Further, the signal processing unit 16a provides a digital signal to the sensor unit 14 so that a voltage signal VTX2 at a high level is applied to the second transfer electrode TX2 in the second transfer period T2 of the $n^{th}$ first charge transfer cycle Cy1.

The first transfer period T1 is synchronized with the drive pulse signal SL. In other words, a rising timing of the drive pulse signal SL and a rising timing of the voltage signal VTX1 are substantially synchronized with each other, and durations T0 of the drive pulse signal SL and the first transfer period T1 have substantially the same time length.

Further, the second transfer period T2 is inverted in phase with the first transfer period T1. In other words, the phase of the second transfer period T2 is delayed by 180 degrees from the phase of the first transfer period T1. More specifically, a falling timing of the voltage signal VTX1 and a rising timing of the voltage signal VTX2 are substantially synchronized with each other, and the first transfer period T1 and the second transfer period T2 have substantially the same time length. It should be noted that in the present embodiment, the first charge transfer cycle Cy1 includes one first transfer period T1 and one second transfer period T2.

In an embodiment, the signal processing unit 16a provides a digital signal to the sensor unit 14 so that a voltage signal VTX3 at a Low level is applied to the third transfer electrodes TX3 during the first transfer period T1 and the second transfer period T2 of the first charge transfer cycle Cy1. The voltage signal VTX3 at a high level is applied to the third transfer electrodes TX3 in a period other than the first transfer period T1 and the second transfer period T2 in the first charge transfer cycle Cy1. Therefore, the charges according to the incident light to the photosensitive region are not transferred to the semiconductor region SR3 in the first transfer period T1 and the second transfer period T2 of the first charge transfer cycle Cy1, but the charges generated in the photosensitive region are transferred to the semiconductor region SR3 and removed in a period other than the first transfer period T1 and the second transfer period T2 of the first charge transfer cycle Cy1.

Then, the signal processing unit 16a acquires the first readout value Q1ac(n) corresponding to the amount of charges accumulated in the first accumulation region fd1 and the second readout value Q2ac(n) corresponding to the amount of charges accumulated in the second accumulation region fd2 from the sensor unit 14, and stores the first readout value Q1ac(n) and the second readout value Q2ac(n) in the memory 16b (step S15).

Specifically, the signal processing unit 16a provides a sampling pulse signal Ssamp to the switch SW10 and the switch SW12 at a time point between an end time point of the $n^{th}$ first charge transfer cycle and a start time point of the $n^{th}$ second charge transfer cycle. Accordingly, the voltage corresponding to the amount of charges accumulated in the first accumulation region fd1 at a time point between an end time point of the first charge transfer cycle and a start time point of the second charge transfer cycle is held in the sample-and-hold circuit SH1, and the voltage corresponding to the amount of charges accumulated in the second accumulation region fd2 at the time point is held in the sample-and-hold circuit SH2.

Then, the signal processing unit 16a provides a start signal and a clock signal to the horizontal shift register group HSG so that a readout pulse signal Sread is provided from the horizontal shift register to the switches SW1 and SW2 in the $n^{th}$ first readout cycle. Accordingly, the processing unit 16 acquires a first readout value Q1ac(n) and a second readout value Q2ac(n) from the sensor unit 14. The first readout value Q1ac(n) is a value corresponding to the amount of charges accumulated in the first accumulation region fd1 at a time point between the end of the $n^{th}$ first charge transfer cycle and the start of the $n^{th}$ second charge transfer cycle, and the second readout value Q2ac(n) is a value corresponding to the amount of charges accumulated in the second accumulation region fd2 at the time point.

Then, the signal processing unit 16a stops emission of the modulation light of the light source unit 12 in the $n^{th}$ second charge transfer cycle Cy2 (step S16). In other words, in the second charge transfer cycle Cy2, the signal processing unit 16a does not supply the drive pulse signal to the light source unit 12.

The signal processing unit 16a provides a digital signal to the sensor unit 14 so that a voltage signal VTX1 at a high level is applied to the first transfer electrode TX1 in the third transfer period T3 of the $n^{th}$ second charge transfer cycle Cy2. Further, the signal processing unit 16a provides a digital signal to the sensor unit 14 so that a voltage signal VTX2 at a high level is applied to the second transfer electrode TX2 in the fourth transfer period T4 of the $n^{th}$ second charge transfer cycle Cy2.

A relationship between the phase of the third transfer period T3 and the phase of the fourth transfer period T4 is the same as the relationship between the phase of the first transfer period T1 and the phase of the second transfer period T2. Further, the first transfer period T1, the second transfer period T2, the third transfer period T3 and the fourth transfer period T4 have substantially the same time length.

Further, the signal processing unit 16a provides a digital signal to the sensor unit 14 so that a voltage signal VTX3 at a low level is applied to the third transfer electrodes TX3 during the third transfer period T3 and the fourth transfer period T4 even in the $n^{th}$ second charge transfer cycle Cy2. Further, the signal processing unit 16a provides the digital signal to the sensor unit 14 so that the voltage signal VTX3 at a high level is applied to the third transfer electrode TX3 in a period other than the third transfer period T3 and the fourth transfer period T4.

The signal processing unit 16a then acquires the first readout value Q1dc(n) corresponding to the amount of charges accumulated in the first accumulation region fd1 and the second readout value Q2dc(n) corresponding to the amount of charges accumulated in the second accumulation region fd2 from the sensor unit 14, and stores the first readout value Q1dc(n) and the second readout value Q2dc(n) in the memory 16b (step S17).

Specifically, the signal processing unit 16a provides a sampling pulse signal Ssamp to the switch SW10 and the switch SW12 between the end of the $n^{th}$ second charge transfer cycle and the start of the $(n+1)^{th}$ first charge transfer cycle. Accordingly, the voltage corresponding to the amount of charges accumulated in the first accumulation region fd1 at the time point between the end of the second charge transfer cycle and the start of the next first charge transfer cycle is held in the sample-and-hold circuit SH1, and the voltage corresponding to the amount of charges accumulated in the second accumulation region fd2 at the time point is held in the sample-and-hold circuit SH2.

Then, the signal processing unit 16a provides a start signal and a clock signal to the horizontal shift register group HSG so that the readout pulse signal Sread is provided from the horizontal shift register to the switches SW1 and SW2 in the $n^{th}$ second readout cycle. Accordingly, the processing unit 16 acquires the first readout value Q1dc(n) and the second readout value Q2dc(n) from the sensor unit 14. The first readout value Q1dc(n) is a value corresponding to the amount of charges accumulated in the first accumulation region fd1 at a time point between the end of the $n^{th}$ second charge transfer cycle and the start of the $(n+1)^{th}$ first charge transfer cycle, and the second readout value Q2dc(n) is a value corresponding to the amount of charges accumulated in the second accumulation region fd2 at the time point.

Then, the signal processing unit 16a calculates the first value Q1(n) and the second value Q2(n) (step S18). Specifically, the first value Q1(n) is obtained by subtracting the first readout value Q1dc(n−1) and the first readout value Q1dc(n) from a value of twice the first readout value Q1ac(n). Further, the second value Q2(n) is obtained by subtracting the second readout value Q2dc(n−1) and the second readout value Q2dc(n) from a value of twice the second readout value Q2ac(n).

Then, the signal processing unit 16a calculates a difference value k1(n) and a difference value k2(n) (step S19). The difference value k1(n) is obtained as a difference between the first readout value Q1dc(n) of the $n^{th}$ second readout cycle and the first readout value Q1dc(n−1) of the $(n-1)^{th}$ second readout cycle. Further, the difference value k2(n) is obtained as a difference between the second readout value Q2dc(n) of the $n^{th}$ second readout cycle and the second readout value Q2dc (n−1) of the $(n-1)^{th}$ second readout cycle. Further, Q1(0) may be substituted for the first readout value Q1dc(0), and Q2(0) may be substituted for the second readout value Q2dc(0).

Then, the signal processing unit 16a obtains a first predicted value Q1dc(n+1) and a second predicted value Q2dc(n+1) (step S20). The first predicted value Q1dc(n+1) is obtained as a sum of the first readout value Q1dc(n) and the difference value k1 (n). Further, the second predicted value Q2dc(n+1) is obtained as a sum of the second readout value Q2dc(n) and the difference value k2(n). The first predicted value Q1dc(n+1) is a predicted value of the first readout value of the $(n+1)^{th}$ second readout cycle. Further, the second predicted value Q2dc(n+1) is a predicted value of the second readout value of the $(n+1)^{th}$ second readout cycle.

Then, the signal processing unit 16a compares the first predicted value Q1dc(n+1) and the second predicted value Q2dc(n+1) with a predetermined threshold Qth (step S21). In an embodiment, the threshold Qth is set to be a numerical value equal to or more than the first readout value corresponding to a saturation accumulation capacity of the first accumulation region fd1 and equal to or more than the second readout value corresponding to a saturation accumulation capacity of the second accumulation region fd2. When the first predicted value Q1dc(n+1) is equal to or more than the threshold Qth and the second predicted value Q2dc(n+1) is equal to or more than the threshold Qth, a determination result of step S21 is "No" and the process of the signal processing unit 16a proceeds to step S22. In step S22, it is tested whether n is equal to or more than N. When n is less than N in step S22, the signal processing unit 16a increments the value of n by 1 (step S23) and repeats the process from step S14. On the other hand, when n is equal to or more than N in step S22, the process of the signal processing unit 16a proceeds to step S24.

Further, when the first predicted value Q1dc(n+1) or the second predicted value Q2dc(n+1) exceeds the threshold Qth, i.e., is smaller than the threshold as determined in the comparison of step S21, the process of the signal processing unit 16a proceeds to step S24. Therefore, when the first predicted value Q1dc(n+1) or the second predicted value Q2dc(n+1) exceeds the threshold Qth, the processing unit 16 stops the acquisition and the storage of the readout values of the first readout cycle subsequent to the $(n+1)^{th}$ first readout cycle and the second readout cycle subsequent to the $(n+1)^{th}$ second readout cycle.

When the threshold Qth is the same value as the greater of the first readout value corresponding to the saturation accumulation capacity of the first accumulation region fd1 and the second readout value corresponding to the saturation accumulation capacity of the second accumulation region fd2, the processing unit 16 may acquire the first readout value in a range not exceeding the readout value corresponding to the saturation accumulation capacity of the first accumulation region fd1 and may acquire the second readout value in a range not exceeding the readout value corresponding to the saturation accumulation capacity of the second accumulation region fd2. As a result, a dynamic range of the measured distance can be improved. Further, accuracy of the distance measurement can be improved. Furthermore, calculation subsequent to step S24 of the signal processing unit 16a can start early.

In an embodiment, the threshold Qth may be set to a value greater than the greater of the first readout value corresponding to the saturation accumulation capacity of the first accumulation region fd1 and the second readout value corresponding to the saturation accumulation capacity of the second accumulation region fd2. According to this embodiment, the sensor unit 14 can be used in a range in which a linear characteristic of a relationship between the amount of accumulated charges of each of the first accumulation region fd1 and the second accumulation region fd2 and an incident light amount is excellent. Therefore, the accuracy of the distance measurement can be further improved.

Then, the signal processing unit 16a obtains the first estimated value Q1est and the second estimated value Q2est (step S24). The first estimated value Q1est is calculated based on M first values Q1(1, ..., M). Specifically, the first estimated value Q1est is calculated by adding the value Q1dc(0) to a value obtained by integrating the M first values Q1(1, ..., M), as shown in Equation (1).

[Equation 1]

$$Q1est = \sum_{i=1}^{M} Q1(i) + Q1dc(0) \quad (1)$$

Further, the second estimated value Q2est is calculated based on the M second values Q2(1, ..., M). Specifically, the second estimated value Q2est is calculated by adding the value Q2dc(0) to a value obtained by integrating the M second values Q2(1, ..., M), as shown in Equation (2).

[Equation 2]

$$Q2est = \sum_{i=1}^{M} Q2(i) + Q2dc(0) \quad (2)$$

When "n" is "N," i.e., when the first readout cycle and the second readout cycle are performed up to the predetermined maximum number N, "M" becomes "N." On the other hand, when the first readout cycle and the second readout cycle are not performed up to the predetermined maximum number N, "M" becomes a numerical value indicating an order of the last first readout cycle and the last second readout cycle.

Then, the signal processing unit 16a calculates the distance (step S25). Specifically, the signal processing unit 16a calculates a distance L through calculation of Equation (3) below.

[Equation 3]

$$L(\tfrac{1}{2}) \times c \times T0 \times \{(Q2est \times \alpha)/(Q1est + Q2est \times \alpha)\} \quad (3)$$

where, c is velocity of light, and α is a ratio of the first readout value and the second readout value when the same amount of incident light is incident on the photosensitive region in the first transfer period T1 and the second transfer period T2.

In an embodiment, the signal processing unit 16a outputs a distance image of one row having a gray value corresponding to the distance calculated for each pixel. Further, in an embodiment, the signal processing unit 16a may repeat the control and the calculation described with reference to FIGS. 7 and 8 to update the distance image in every frame period.

Q1ac(n), Q1dc(n), Q2ac(n) and Q2dc(n) are expressed by Equation (4) below.

[Equation 4]

$$Q1ac(n) = \sum_{i=1}^{n} q1aa(i) + \sum_{i=1}^{n} q1ad(i) + \sum_{i=1}^{n-1} q1dd(i)$$

$$Q2ac(n) = \sum_{i=1}^{n} q2aa(i) + \sum_{i=1}^{n} q2ad(i) + \sum_{i=1}^{n-1} q2dd(i)$$

$$Q1dc(n) = \sum_{i=1}^{n} q1aa(i) + \sum_{i=1}^{n} q1ad(i) + \sum_{i=1}^{n-1} q1dd(i)$$

$$Q2dc(n) = \sum_{i=1}^{n} q2aa(i) + \sum_{i=1}^{n} q2ad(i) + \sum_{i=1}^{n-1} q2dd(i)$$

(4)

In equation (4), q1aa is a value corresponding to an increase of the charge amount based on the reflected light from an object for the modulation light, i.e., signal light in the increase of the amount of charges of the first accumulation region in the $n^{th}$ first charge transfer cycle. q2aa is a value corresponding to an increase of the charge amount based on the signal light in the increase in the amount of charges of the second accumulation region in the $n^{th}$ first charge transfer cycle. q1ad is a value corresponding to an increase of the charge amount based on a factor other than the signal light in the increase in the amount of charges of the first accumulation region in the $n^{th}$ first charge transfer cycle. q2ad is a value corresponding to an increase of the charge amount based on the factor other than the signal light in the increase in the amount of charges of the second accumulation region in the $n^{th}$ first charge transfer cycle. q1dd is a value corresponding to an increase in the amount of charges of the first accumulation region in the $n^{th}$ second charge transfer cycle. Further, q2dd is a component corresponding to the increase of the amount of charges of the second accumulation region in the $n^{th}$ second charge transfer cycle.

Therefore, the first value Q1(n) and the second value Q2(n) are expressed by Equations (5) and (6) below.

[Equation 5]

$$2Q1ac(n) - Q1dc(n) - Q1dc(n-1) =$$

$$2\sum_{i=1}^{n} q1aa(i) + 2\sum_{i=1}^{n} q1ad(i) + 2\sum_{i=1}^{n-1} q1dd(i) - \sum_{i=1}^{n} q1aa(i) -$$

$$\sum_{i=1}^{n} q1ad(i) - \sum_{i=1}^{n-1} q1dd(i) - \sum_{i=1}^{n-1} q1aa(i) - \sum_{i=1}^{n-1} q1ad(i) -$$

$$\sum_{i=1}^{n-1} q1dd(i) = q1aa(n) - q1ad(n) - q1dd(n) \approx q1aa(n)$$

(5)

[Equation 6]

$$2Q2ac(n) - Q2dc(n) - Q2dc(n-1) =$$

$$2\sum_{i=1}^{n} q2aa(i) + 2\sum_{i=1}^{n} q2ad(i) + 2\sum_{i=1}^{n-1} q2dd(i) - \sum_{i=1}^{n} q2aa(i) -$$

$$\sum_{i=1}^{n} q2ad(i) - \sum_{i=1}^{n-1} q2dd(i) - \sum_{i=1}^{n-1} q2aa(i) - \sum_{i=1}^{n-1} q2ad(i) -$$

$$\sum_{i=1}^{n-1} q2dd(i) = q2aa(n) - q2ad(n) - q2dd(n) \approx q2aa(n)$$

(6)

Thus, the first value Q1(n) indicates the increase of the charge amount based on the signal light in the increase of the charge amount of the first accumulation region in the $n^{th}$ first charge transfer cycle. Further, the second value Q2(n) indicates the increase of the charge amount based on the signal light in the increase of the charge amount of second accumulation region in the $n^{th}$ second charge transfer cycle.

The first estimated value Q1est is calculated based on the first value Q1 and the second estimated value Q2est is calculated based on the second value Q2, as is apparent from the calculation of steps S18, S24 and S25. Therefore, the distance L calculated through calculation of Equation (3) is based on the first value Q1 and the second value Q2, and is obtained based on a value from which a noise has been removed. Thus, the distance measurement device 10 can calculate the distance with high precision without reducing a frame rate even when a noise such as background light fluctuating in a short period is generated.

Further, in the embodiment described above, each of the number of first transfer periods and the number of second transfer periods included in the first readout cycle is 1. Therefore, it is possible to shorten a time length of each cycle. Thus, according to the present embodiment, it is possible to calculate the distance with high precision even when the noise fluctuating in a shorter period is generated.

In an embodiment, the signal processing unit 16a may calculate the first estimated value Q1est and the second estimated value Q2est, as will be described hereinafter. The signal processing unit 16a sequentially integrates the first values Q1(1, . . . , M) to obtain M first integrated values Q1int(1, . . . , M), and sequentially integrates the second values Q1(1, . . . , M) to obtain M second integrated values Q2int(1k, . . . M), as shown in Equation (7).

[Equation 7]

$$Q1\text{int}(j) = \sum_{i=1}^{j} Q1(i) \quad (j = 1, \ldots M)$$

$$Q2\text{int}(j) = \sum_{i=1}^{j} Q2(i) \quad (j = 1, \ldots M)$$

(7)

Then, the signal processing unit 16a calculates a correction value of the first integrated value Q1int and a correction value of the second integrated value Q2int using an approximate equation based on the M first integrated values Q1int(1, . . . , M) and an approximate equation based on the M second integrated values Q2int(1, . . . , M). Then, the signal processing unit 16a calculates a first estimated value Q1est by obtaining a sum of the correction value of the first integrated value Q1int and the value Q1dc(0). Similarly, the signal processing unit 16a calculates a second estimated value Q2est by obtaining a sum of the correction value of the second integrated value Q2int and the value Q2(0). In an embodiment, the correction value of the first integrated value Q1int may be a correction value of all the integrated values of the M first values Q1(1, . . . , M), and the correction value of the second integrated value Q2int may be a correction value of all the integrated values of the M second values Q2(1, . . . , M). The approximate equation may be produced based on a least-square method. Further, other known approximate equation producing methods may be used.

In the present embodiment, the first estimated value Q1est is based on the correction value of the first integrated value Q1int calculated using the approximate equation, and the second estimated value Q2est is based on the correction value of the second integrated value Q2int calculated using the approximate equation. Therefore, even when some of the M first values Q1(1, . . . , M) and M second values Q2(1, . . . , M) fluctuate due to noise or the like, an influence of the readout value including the fluctuation can be reduced in the first estimated value Q1est and the second estimated value Q2est based on the approximate equation. Thus, the accuracy of the distance measurement can be further improved.

Figure 9:
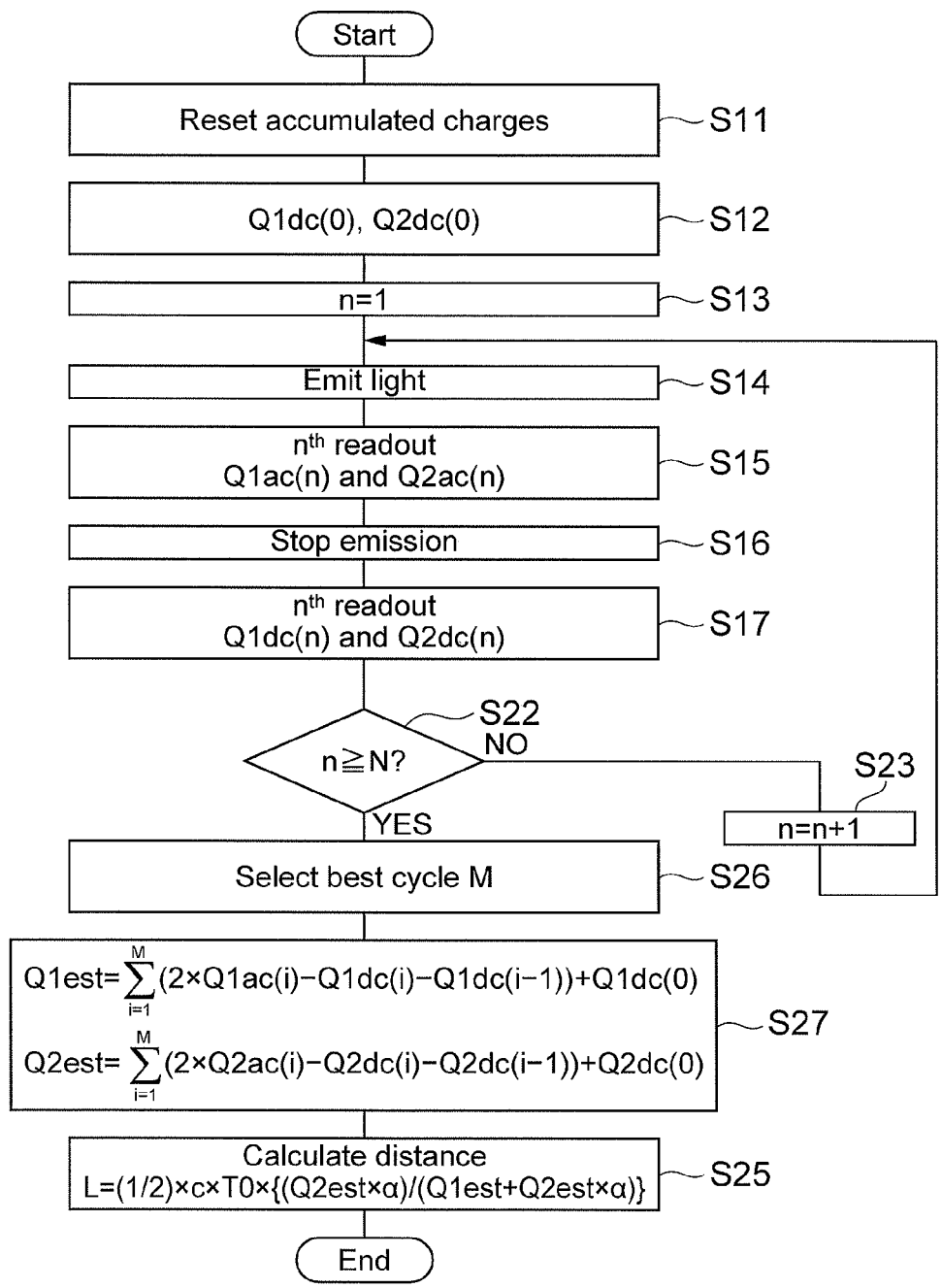
FIG. 9 is a flowchart illustrating control and calculation of the processing unit according to another embodiment.

Hereinafter, another embodiment will be described. FIG. 9 is a flowchart illustrating control and calculation of the processing unit according to another embodiment. The processing unit 16 of the distance measurement device 10 may perform control and calculation illustrated in FIG. 9. The processing unit 16 of the distance measurement device 10 does not perform steps S18 to S21 of FIG. 7 in the control and calculation shown in the flowchart of FIG. 9. In other words, a process of steps S14 to S17 is performed up to predetermined N first and second readout cycles.

Then, the signal processing unit 16a of the processing unit 16 identifies the $M^{th}$ first and second best readout cycles among the N first and second readout cycles which have been executed (step S26). In an embodiment, the $M^{th}$ best readout cycle may be obtained as a maximum readout cycle in which the first readout value Q1dc and the second readout value Q2dc not exceeding a predetermined threshold, i.e., equal to or more than the threshold, are acquired among the N readout cycles. This predetermined threshold may be set as a value equal to or more than the greater of a readout value corresponding to a saturation charge amount of the first accumulation region fd1 and a readout value corresponding to the saturation charge amount of the second accumulation region fd2.

Then, the first estimated value Q1est and the second estimated value Q2est are calculated (step S27). In an embodiment, the first estimated value Q1est is obtained by adding the integrated value of the first values Q1(1, . . . , M) to the value Q1dc(0), which are described in steps S18 and S24 above, as shown in Equation (8). Further, the second estimated value Q2est is obtained by adding the integrated values of the second values Q2(1, . . . , M) to the value Q2dc(0).

[Equation 8]

$$\left. \begin{array}{l} Q1est = \sum_{i=1}^{M}(2 \times Q1ac(i) - Q1dc(i) - Q1dc(i-1)) + Q1dc(0) \\ Q2est = \sum_{i=1}^{M}(2 \times Q2ac(i) - Q2dc(i) - Q2dc(i-1)) + Q2dc(0) \end{array} \right\} \quad (8)$$

In another embodiment, the first estimated value Q1est is obtained by obtaining the M first values Q1(1, . . . , M), sequentially integrating the first values Q1(1, . . . , M) to obtain M first integrated values Q1int(1, . . . , M) as shown in Equation (7), calculating a correction value of the first integrated value Q1int using an approximate equation based on the M first integrated values Q1int(1, . . . , M), and obtaining a sum of the correction value and Q1dc(0). Further, the second estimated value Q2est is obtained by obtaining the M second values Q2(1, . . . , M), sequentially integrating the M second values Q2(1, . . . , M) to obtain the M second integrated values Q2int(1, . . . , M) as shown in Equation (7), calculating a correction value of the second integrated value Q1int using an approximate equation based on the M second integrated values Q2int(1, . . . , M), and obtaining a sum of the correction value and Q2dc(0).

In the flowchart illustrated in FIG. 9, the signal processing unit 16a calculates the distance L according to Equation (3) using the first estimated value Q1est and the second estimated value Q2est obtained in step S27. Thus, the best cycle M may be identified and the distance L may be calculated after the N first and second readout cycles determined in advance.

Figure 10:
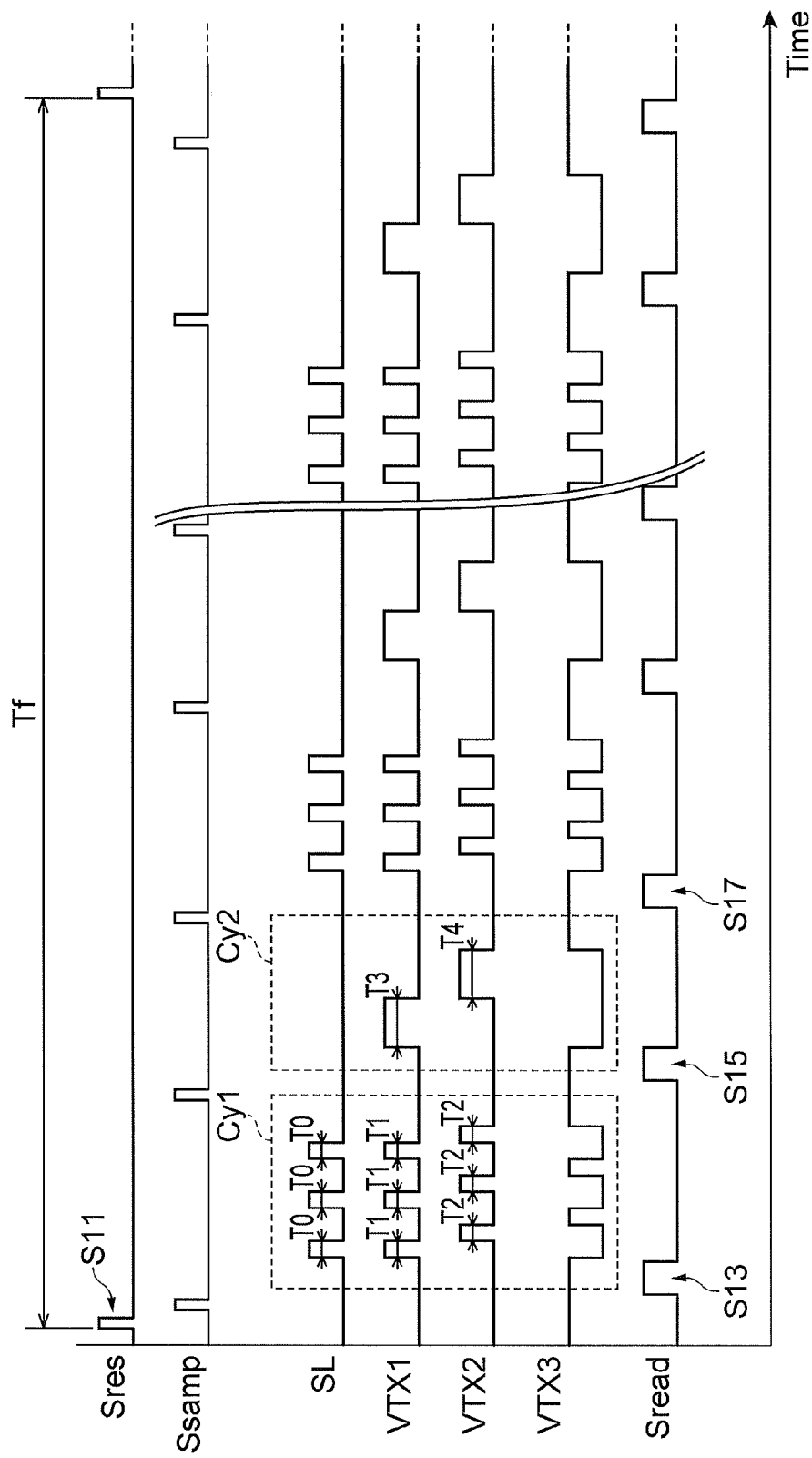
FIG. 10 is a timing chart of various signals used in the distance measurement device according to yet another embodiment.

Next, yet another embodiment will be described with reference to FIG. 10. FIG. 10 is a timing chart of various signals used in the distance measurement device according to yet another embodiment. In an embodiment, a plurality of emission periods of the modulation light from the light source unit 12 are set in each first charge transfer cycle Cy1, as shown in the timing chart of FIG. 10. In other words, a drive pulse signal is provided to the light source unit 12 in the plurality of emission periods in each first charge transfer cycle Cy1.

In FIG. 10, three emission periods of the modulation light are provided in each first charge transfer cycle Cy1. A first transfer period T1 is provided in synchronization with each emission period of the modulation light, and a second transfer period T2 inverted in phase with the first transfer period T1 is provided. Therefore, three first transfer periods T1 and three second transfer periods T2 are provided in each first charge transfer cycle Cy1. Further, a time length of a third transfer period T3 of each second charge transfer cycle Cy2 is set to a time length of three times the first transfer period T1, and a time length of a fourth transfer period T4 of each second charge transfer cycle Cy2 is set to a time length of three times the time length of the second transfer period T2.

Therefore, a time length in which charges are accumulated in the first accumulation region fd1 in each first charge transfer cycle Cy1, a time length in which charges are accumulated in the second accumulation region fd2 in each first charge transfer cycle Cy1, a time length in which charges are accumulated in the first accumulation region fd1 in each second charge transfer cycle Cy2, and a time length in which charges are accumulated in the second accumulation region fd2 in each second charge transfer cycle Cy2 are substantially the same time lengths. Thus, the plurality of emission periods of the modulation light, the plurality of first transfer periods T1, and the plurality of second transfer periods T2 may be provided in each first charge transfer cycle Cy1.

Figure 11:
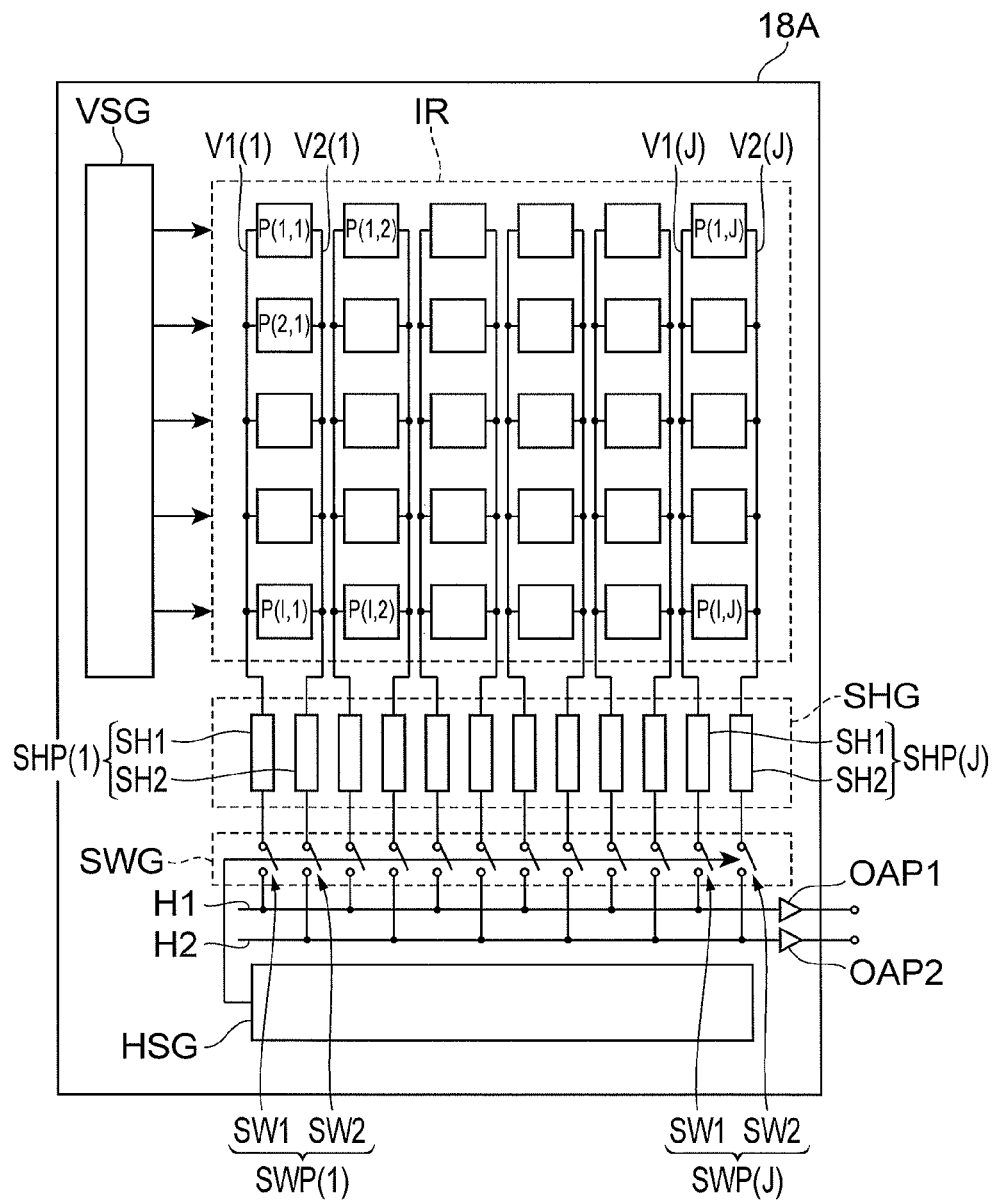
FIG. 11 is a diagram schematically illustrating an example of a sensor of yet another embodiment.
Figure 12:
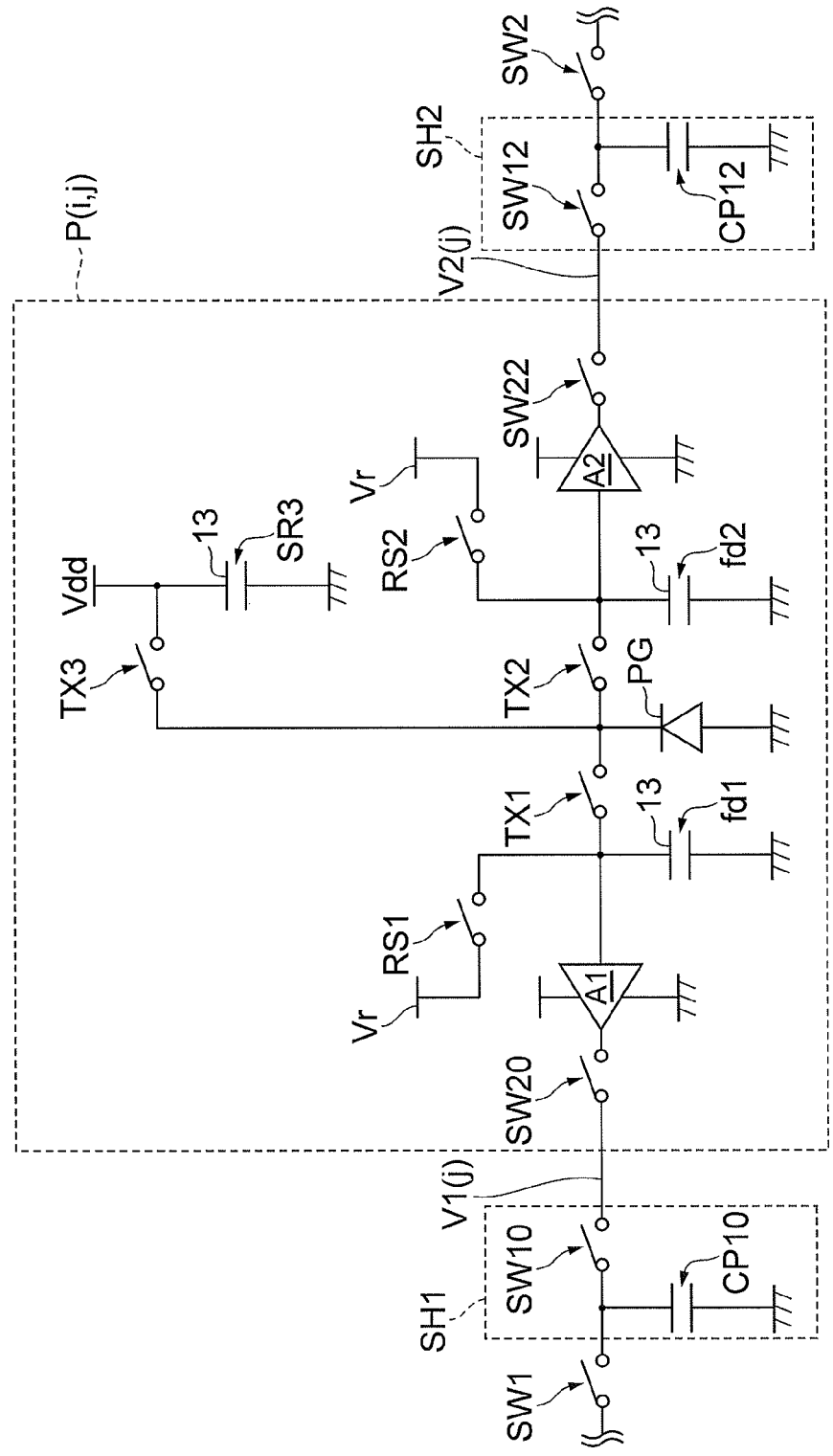
FIG. 12 is a circuit diagram of one pixel unit of the sensor unit and corresponding sample-and-hold circuits for the pixel unit according to yet another embodiment.

Hereinafter, yet another embodiment will be described with reference to FIGS. 11 and 12. FIG. 11 is a diagram illustrating an example of a sensor according to yet another embodiment. FIG. 12 is a circuit diagram of one pixel unit of a sensor unit and corresponding sample-and-hold circuits for the pixel unit according to yet another embodiment. A distance measurement device 10 may include a sensor 18A illustrated in FIG. 11 in place of the sensor 18. The sensor 18A includes an imaging region IR having I×J pixel units P(i, j). Here, i is an integer ranging from 1 to I, j is an integer ranging 1 to J, and I and J are integers equal to or more than 2. The I×J pixel units P(i, j) are arranged in I rows and J columns. Two vertical signal lines V1(j) and V2(j) for each column of the pixel unit are provided in the imaging region IR.

A switch SW20 is connected to an output of a circuit A1 of the pixel unit P(i, j) of the sensor 18A, and the switch SW20 is connected to a switch SW10 of a corresponding sample-and-hold circuit SH1 via a corresponding vertical signal line V1(j), as illustrated in FIG. 12. Further, a switch SW22 is connected to an output of a circuit A2 of the pixel unit P(i, j), and the switch SW22 is connected to a switch SW12 of a corresponding sample-and-hold circuit SH2 via a corresponding vertical signal line V2(j).

The sensor 18A further includes a vertical shift register group VSG. The vertical shift register group VSG includes a plurality of vertical shift registers arranged in a vertical direction. Each vertical shift register includes, for example, a flip-flop. A start signal is provided from the signal processing unit 16a to the vertical shift register provided in one end in an arrangement direction. Further, a clock signal is provided from the signal processing unit 16a to all the vertical shift registers. When the vertical shift register group VSG receives the start signal and the clock signal, the vertical shift register group VSG sequentially provides a row selection signal to the switches SW20 and the switches SW22 of a plurality of pixel units P(i, j) in order of rows. Accordingly, outputs of the circuits A1 and A2 of the plurality of pixel units (i, j) of each column are sequentially connected to the corresponding vertical signal lines V1(j) and V2(j), and output voltages of the plurality of pixel units P(i, j) are sequentially held in the corresponding sample-and-hold circuits SH1 and SH2 in order of rows. Further, when the output voltages of the plurality of pixel units (j, i) in each row are held in the corresponding sample-and-hold circuits SH1 and SH2, the voltages held in the sample-and-hold circuits SH1 and SH2 are sequentially coupled to the signal lines H1 and H2 in order of columns by the readout pulse signal to be provided from the horizontal shift register group HSG. Then, the signal processing unit 16a can form a two-dimensional distance image by performing the calculation described in FIG. 7 or 9 for each pixel unit.

It should be noted that the present invention is not limited to the embodiments described above and various variants may be configured. For example, while the corresponding sample-and-hold circuits SH1 and SH2 are provided in every column of the pixel unit in the embodiment illustrated in FIG. 11, the corresponding sample-and-hold circuits SH1 and SH2 may be provided in every pixel unit. Further, the number of pixel units of the imaging region IR may be 1. Further, an order of the plurality of steps in the flowchart described in FIGS. 7 and 9 may be arbitrarily changed as long as it does not contradict the purpose of these embodiments.

REFERENCE SIGNS LIST

10 . . . distance measurement device, 12 . . . Light source unit, 12a . . . Laser diode, 12b . . . Driver circuit, 14 . . . Sensor unit, 16 . . . Processing unit, 16a . . . Signal processing unit, 16b . . . Memory, 18 . . . Sensor, 20 . . . DAC (digital-to-analog conversion unit), 22 . . . ADC (analog-to-digital conversion unit), fd1 . . . First accumulation region, fd2 . . . Second accumulation region, TX1 . . . First transfer electrode, TX2 . . . Second transfer electrode, A1 . . . Charge-to-voltage conversion circuit (first conversion unit), A2 . . . Charge-to-voltage conversion circuit (second conversion unit), SH1 . . . First sample-and-hold circuit, SH2 . . . Second sample-and-hold circuit.

The invention claimed is:

1. A distance measurement device for determining a distance from an object using a time-of-flight method, the distance measurement device comprising:
a light source unit which emits modulation light;
a sensor unit including a photosensitive region which generates charges according to incident light, a first accumulation region and a second accumulation region which accumulate the charges generated in the photosensitive region, a first transfer electrode provided between the photosensitive region and the first accumulation region, a second transfer electrode provided between the photosensitive region and the second accumulation region, a first reset switch provided between the first accumulation region and a reset potential, and a second reset switch provided between the second accumulation region and the reset potential; and
a processing unit which controls an emission timing of the modulation light and the sensor unit to calculate a distance,
wherein the processing unit:
in a plurality of first charge transfer cycles in a frame period, causes the light source unit to emit in one or more emission periods, controls a voltage to be applied to the first transfer electrode in one or more first transfer periods synchronized with the one or more emission periods to cause charges generated in the photosensitive region to be accumulated in the first accumulation region, and controls a voltage to be applied to the second transfer electrode in one or more second transfer periods inverted in phase with the one or more first transfer periods to cause charges generated in the photosensitive region to be accumulated in the second accumulation region, wherein the frame period continues from a time at which the first accumulation region and the second accumulation region are connected to the reset potential with control of the first reset switch and the second reset switch to a time at which the first accumulation region and the second accumulation region are next connected to the reset potential;
in a plurality of second charge transfer cycles which alternates with the plurality of the first charge transfer cycles in the frame period, controls a voltage to be applied to the first transfer electrode in a third transfer period to cause charges generated in the photosensitive region to be accumulated in the first accumulation region, and controls voltage to be applied to the second transfer electrode in a fourth transfer period inverted in phase with the third transfer period to cause charges generated in the photosensitive region to be accumulated in the second accumulation region, without causing the light source unit to emit the modulation light;
in a plurality of first readout cycles corresponding to the plurality of first charge transfer cycles, acquires, from the sensor unit, first readout values corresponding to amounts of charges accumulated in the first accumulation region at time points between the first charge transfer cycles and the following second charge transfer cycles, respectively, and second readout values corresponding to amounts of charges accumulated in the second accumulation region at the time points, respectively;
in a plurality of second readout cycles corresponding to the plurality of second charge transfer cycles, acquires, from the sensor unit, first other readout values corresponding to amounts of charges accumulated in the first accumulation region at time points between the plurality of second charge transfer cycles and the following first charge transfer cycles, respectively, and second other readout values corresponding to amount of charges accumulated in the second accumulation region at the time points, respectively;
calculates a first value that is a value obtained by subtracting the first other readout values of the $n^{th}$ and $(n-1)^{th}$ second readout cycles from a value of twice the first readout value of the $n^{th}$ first readout cycle, and a second value that is a value obtained by subtracting the second other readout value of the $n^{th}$ and $(n-1)^{th}$ second readout cycles from a value of twice the second readout value of the $n^{th}$ first readout cycle to determine M first values and M second values, where n indicates an order of the plurality of first readout cycles and the plurality of second readout cycles; and calculates the distance based on the M first values and the M second values.

2. The distance measurement device according to claim 1, wherein a time length in which the charges are accumulated in the first accumulation region in each of the first charge transfer cycles, a time length in which the charges are accumulated in the second accumulation region in each of the first charge transfer cycles, a time length in which the charges are accumulated in the first accumulation region in each of the second charge transfer cycle, and a time length in which the charges are accumulated in the second accumulation region in each of the second charge transfer cycle are substantially the same time length.

3. The distance measurement device according to claim 1, wherein each of the plurality of first charge transfer cycles includes one first transfer period and one second transfer period.

4. The distance measurement device according to claim 1, wherein the processing unit:
   identifies a last second readout cycle in which the first other readout value and the second other readout value do not exceed a predetermined threshold among the plurality of second readout cycles; and
   determines the M first values based on one or more first readout values and two or more first other readout values obtained up to the last second readout cycle, and determines the M second values based on one or more second readout values and two or more second other readout values obtained up to the last second readout cycle.

5. The distance measurement device according to claim 1, wherein the processing unit:
   stops the first readout cycle and the second readout cycle subsequent to the $(n+1)^{th}$ cycle when a sum of the first other readout value of the $n^{th}$ second readout cycle and a difference value between the first other readout value of the $n^{th}$ second readout cycle and the first other readout value of the $(n-1)^{th}$ second readout cycle or a sum of the second other readout value of the $n^{th}$ second readout cycle and a difference value between the second other readout value of the $n^{th}$ second readout cycle and the second other readout value of the $(n-1)^{th}$ second readout cycle exceeds a predetermined threshold; and
   determines the M first values based on one or more first readout values and two or more first other readout values obtained up to the $n^{th}$ second readout cycle which is the last readout cycle, and determines the M second values based on one or more second readout values and two or more second other readout values obtained up to the last readout cycle.

6. The distance measurement device according to claim 1, wherein the processing unit calculates the distance based on an integrated value of the M first values and an integrated value of the M second values.

7. The distance measurement device according to claim 1, wherein the processing unit:
   sequentially integrates the M first values to calculate M first integrated values and sequentially integrates the M second values to calculate M second integrated values;
   calculates a first estimated value using an approximate equation based on the M first integrated values and calculates a second estimated value using an approximate equation based on the M second integrated values; and
   calculates the distance based on the first estimated value and the second estimated value.

* * * * *